(12) United States Patent
Kurakane et al.

(10) Patent No.: US 11,205,799 B2
(45) Date of Patent: *Dec. 21, 2021

(54) NONAQUEOUS ELECTROLYTE SECONDARY BATTERY

(71) Applicant: Sumitomo Chemical Company, Limited, Tokyo (JP)

(72) Inventors: Kosuke Kurakane, Osaka (JP); Toshihiko Ogata, Osaka (JP); Chikae Yoshimaru, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 16/224,785

(22) Filed: Dec. 18, 2018

(65) Prior Publication Data

US 2019/0190090 A1 Jun. 20, 2019

(30) Foreign Application Priority Data

Dec. 19, 2017 (JP) .............................. JP2017-243286

(51) Int. Cl.
*H01M 10/0525* (2010.01)
*H01M 10/0585* (2010.01)
(Continued)

(52) U.S. Cl.
CPC ....... *H01M 10/0525* (2013.01); *H01M 4/131* (2013.01); *H01M 4/133* (2013.01);
(Continued)

(58) Field of Classification Search
CPC ......... H01M 10/0525; H01M 10/0585; H01M 2/1686; H01M 2/1653; H01M 2/1673;
(Continued)

(56) References Cited

U.S. PATENT DOCUMENTS

| 3,931,446 A | 1/1976 | Murayama et al. |
| 4,923,650 A | 5/1990 | Antoon, Jr. et al. |

(Continued)

FOREIGN PATENT DOCUMENTS

| CN | 1041167 A | 4/1990 |
| CN | 1322021 A | 11/2001 |

(Continued)

OTHER PUBLICATIONS

Office Action dated Mar. 12, 2019 in JP Application No. 2017243286 (Partial English Translation).

(Continued)

*Primary Examiner* — Eugenia Wang
(74) *Attorney, Agent, or Firm* — Panitch Schwarze Belisario & Nadel LLP

(57) ABSTRACT

The present invention provides a nonaqueous electrolyte secondary battery in which a decrease in discharge capacity after a charge-discharge cycle is reduced. The nonaqueous electrolyte secondary battery in accordance with an aspect of the present invention includes (i) a positive electrode plate and a negative electrode plate whose results of a scratch test carried out in the TD and the MD fall within predetermined ranges, (ii) a nonaqueous electrolyte secondary battery separator that includes a porous film whose temperature rise ending period with respect to a resin amount per unit area at irradiation with microwave falls within a predetermined range, and (iii) a porous layer that contains an α-form polyvinylidene fluoride-based resin of a polyvinylidene fluoride-based resin at a predetermined proportion. The porous layer is arranged between the nonaqueous electrolyte secondary battery separator and at least one of the positive electrode plate and the negative electrode plate.

6 Claims, 1 Drawing Sheet

(51) Int. Cl.

| | | |
|---|---|---|
| *H01M 4/131* | (2010.01) | |
| *H01M 4/133* | (2010.01) | |
| *H01M 4/48* | (2010.01) | |
| *H01M 2/16* | (2006.01) | |
| *H01M 4/587* | (2010.01) | |
| *H01M 50/46* | (2021.01) | |
| *H01M 50/449* | (2021.01) | |
| *H01M 50/426* | (2021.01) | |
| *H01M 50/417* | (2021.01) | |
| *H01M 4/485* | (2010.01) | |
| *H01M 4/62* | (2006.01) | |
| *H01M 4/583* | (2010.01) | |
| *H01M 4/36* | (2006.01) | |
| *H01M 4/505* | (2010.01) | |
| *H01M 4/525* | (2010.01) | |

(52) U.S. Cl.
CPC ............. *H01M 4/48* (2013.01); *H01M 4/485* (2013.01); *H01M 4/587* (2013.01); *H01M 4/622* (2013.01); *H01M 4/623* (2013.01); *H01M 10/0585* (2013.01); *H01M 50/417* (2021.01); *H01M 50/426* (2021.01); *H01M 50/449* (2021.01); *H01M 50/46* (2021.01); *H01M 4/505* (2013.01); *H01M 4/525* (2013.01)

(58) Field of Classification Search
CPC ........ H01M 2/16; H01M 4/366; H01M 4/622; H01M 4/623; H01M 4/583; H01M 4/505; H01M 4/525131; H01M 4/133; H01M 4/48; H01M 4/587505; H01M 4/525; H01M 4/131
See application file for complete search history.

(56) References Cited

U.S. PATENT DOCUMENTS

| | | | |
|---|---|---|---|
| 5,008,296 A | 4/1991 | Antoon, Jr. et al. | |
| 5,011,698 A | 4/1991 | Antoon, Jr. et al. | |
| 5,051,183 A | 9/1991 | Takita et al. | |
| 5,571,634 A | 11/1996 | Gozdz et al. | |
| 6,395,419 B1 | 5/2002 | Kuwahara et al. | |
| 7,208,555 B2 | 4/2007 | Tada et al. | |
| 7,255,957 B2 | 8/2007 | Takahashi | |
| 8,931,647 B2 | 1/2015 | Shiki et al. | |
| 9,508,975 B1 | 11/2016 | Matsuo | |
| 9,876,210 B2* | 1/2018 | Ogata | H01M 2/166 |
| 10,074,840 B2 | 9/2018 | Honda et al. | |
| 10,319,973 B2* | 6/2019 | Ogata | B32B 27/20 |
| 10,361,418 B2* | 7/2019 | Ogata | H01M 2/1686 |
| 10,361,458 B2* | 7/2019 | Ogata | H01M 2/16 |
| 10,367,182 B2* | 7/2019 | Ogata | B32B 27/32 |
| 10,388,932 B2* | 8/2019 | Ogata | H01M 2/1653 |
| 10,461,297 B2* | 10/2019 | Ogata | H01M 2/1686 |
| 10,707,517 B2 | 7/2020 | Arise et al. | |
| 2002/0018936 A1 | 2/2002 | Suzuki et al. | |
| 2002/0136887 A1 | 9/2002 | Penneau et al. | |
| 2003/0031924 A1 | 2/2003 | Lee et al. | |
| 2003/0157314 A1 | 8/2003 | Penneau et al. | |
| 2003/0175494 A1 | 9/2003 | Penneau et al. | |
| 2006/0014912 A1 | 1/2006 | Araki et al. | |
| 2007/0072069 A1 | 3/2007 | Yamada et al. | |
| 2007/0092705 A1 | 4/2007 | Lee et al. | |
| 2007/0190334 A1 | 8/2007 | Araki et al. | |
| 2007/0232709 A1 | 10/2007 | Lee et al. | |
| 2009/0101600 A1 | 4/2009 | Shiki et al. | |
| 2009/0111025 A1 | 4/2009 | Lee et al. | |
| 2009/0148659 A1 | 6/2009 | Ishiodori et al. | |
| 2009/0148685 A1 | 6/2009 | Kang et al. | |
| 2009/0200509 A1 | 8/2009 | Suzuki et al. | |
| 2010/0009265 A1 | 1/2010 | Hatayama et al. | |
| 2010/0123096 A1 | 5/2010 | Suzuki | |
| 2010/0167125 A1 | 7/2010 | Miyaki et al. | |
| 2010/0208177 A1 | 8/2010 | Kobayashi et al. | |
| 2010/0285341 A1 | 11/2010 | Yun et al. | |
| 2011/0027660 A1 | 2/2011 | Takeda et al. | |
| 2011/0212358 A1 | 9/2011 | Usami et al. | |
| 2011/0293989 A1 | 12/2011 | Hasegawa et al. | |
| 2011/0305940 A1 | 12/2011 | Usami et al. | |
| 2012/0028101 A1 | 2/2012 | Ishihara et al. | |
| 2012/0028102 A1 | 2/2012 | Ishihara et al. | |
| 2012/0028131 A1 | 2/2012 | Ishihara et al. | |
| 2012/0034518 A1 | 2/2012 | Ishihara et al. | |
| 2012/0034519 A1 | 2/2012 | Ishihara et al. | |
| 2012/0035285 A1 | 2/2012 | Noumi et al. | |
| 2012/0040232 A1 | 2/2012 | Ishihara et al. | |
| 2012/0135305 A1 | 5/2012 | Kim et al. | |
| 2012/0268072 A1 | 10/2012 | Okuno | |
| 2012/0308898 A1 | 12/2012 | Sawamoto et al. | |
| 2013/0071743 A1 | 3/2013 | Miyaki et al. | |
| 2013/0089770 A1 | 4/2013 | Nishikawa | |
| 2013/0089772 A1 | 4/2013 | Nishikawa | |
| 2013/0095365 A1 | 4/2013 | Nishikawa | |
| 2013/0164618 A1 | 6/2013 | Konishi | |
| 2013/0196208 A1 | 8/2013 | Nemoto | |
| 2013/0252056 A1 | 9/2013 | Ueki et al. | |
| 2013/0266831 A1 | 10/2013 | Motohashi et al. | |
| 2013/0319599 A1 | 12/2013 | Huang | |
| 2013/0337311 A1 | 12/2013 | Itou | |
| 2014/0050965 A1 | 2/2014 | Ha et al. | |
| 2014/0178741 A1 | 6/2014 | Hasegawa et al. | |
| 2014/0272505 A1 | 9/2014 | Yoon et al. | |
| 2014/0363726 A1 | 12/2014 | Honda et al. | |
| 2014/0377630 A1 | 12/2014 | Kawakami et al. | |
| 2015/0093647 A1 | 4/2015 | Kako et al. | |
| 2015/0155541 A1 | 6/2015 | Hasegawa | |
| 2015/0180002 A1 | 6/2015 | Nishikawa et al. | |
| 2015/0188108 A1 | 7/2015 | Miyazawa et al. | |
| 2015/0236323 A1 | 8/2015 | Honda et al. | |
| 2015/0263325 A1 | 9/2015 | Honda et al. | |
| 2015/0280194 A1 | 10/2015 | Mitsuoka et al. | |
| 2015/0349312 A1 | 12/2015 | Ha et al. | |
| 2015/0372276 A1 | 12/2015 | Mizuno et al. | |
| 2016/0036027 A1 | 2/2016 | Nishikawa | |
| 2016/0118639 A1 | 4/2016 | Ishihara | |
| 2016/0181584 A1 | 6/2016 | Hatayama et al. | |
| 2016/0181593 A1* | 6/2016 | Jin | H01M 4/0402 429/223 |
| 2016/0233553 A1 | 8/2016 | Yamasaki et al. | |
| 2016/0268571 A1 | 9/2016 | Honda | |
| 2017/0012265 A1 | 1/2017 | Nakadate et al. | |
| 2017/0033347 A1 | 2/2017 | Murakami et al. | |
| 2017/0033348 A1 | 2/2017 | Murakami et al. | |
| 2017/0098809 A1 | 4/2017 | Ogata et al. | |
| 2017/0141373 A1 | 5/2017 | Murakami et al. | |
| 2017/0155113 A1 | 6/2017 | Hashiwaki et al. | |
| 2017/0155114 A1 | 6/2017 | Kurakane | |
| 2017/0155120 A1* | 6/2017 | Yoshimaru | H01M 2/1653 |
| 2017/0155121 A1 | 6/2017 | Ogata | |
| 2017/0162849 A1 | 6/2017 | Murakami et al. | |
| 2017/0170443 A1 | 6/2017 | Murakami et al. | |
| 2017/0263905 A1* | 9/2017 | Ogata | H01M 2/166 |
| 2017/0279102 A1 | 9/2017 | Hasegawa et al. | |
| 2017/0341035 A1 | 11/2017 | Sato et al. | |
| 2017/0365831 A1* | 12/2017 | Ogata | H01M 2/1653 |
| 2017/0365832 A1 | 12/2017 | Ogata et al. | |
| 2017/0365833 A1* | 12/2017 | Ogata | H01M 2/1653 |
| 2017/0365834 A1* | 12/2017 | Ogata | H01M 2/1653 |
| 2017/0365835 A1* | 12/2017 | Ogata | B32B 27/20 |
| 2017/0365836 A1* | 12/2017 | Ogata | B32B 27/20 |
| 2017/0365878 A1 | 12/2017 | Ogata et al. | |
| 2018/0013118 A1 | 1/2018 | Kawakami et al. | |
| 2018/0083249 A1 | 3/2018 | Hasegawa et al. | |
| 2018/0261878 A1 | 9/2018 | Azami | |
| 2018/0301740 A1 | 10/2018 | Min et al. | |
| 2018/0342720 A1* | 11/2018 | Kurakane | H01M 2/1653 |
| 2019/0074539 A1 | 3/2019 | Shen et al. | |
| 2019/0189993 A1 | 6/2019 | Arise et al. | |
| 2019/0190037 A1 | 6/2019 | Mizuno et al. | |
| 2019/0334149 A1 | 10/2019 | Li et al. | |
| 2019/0386274 A1 | 12/2019 | Wood et al. | |

(56) References Cited

U.S. PATENT DOCUMENTS

| | | | |
|---|---|---|---|
| 2019/0393466 A1 | 12/2019 | Lin et al. | |
| 2020/0052269 A1 | 2/2020 | Taguchi et al. | |
| 2020/0070470 A1* | 3/2020 | Yoshimaru | B32B 5/24 |

FOREIGN PATENT DOCUMENTS

| | | |
|---|---|---|
| CN | 1362892 A | 8/2002 |
| CN | 1825666 A | 8/2006 |
| CN | 1933923 A | 3/2007 |
| CN | 101500696 A | 8/2009 |
| CN | 101516975 A | 8/2009 |
| CN | 101836138 A | 9/2010 |
| CN | 101983219 A | 3/2011 |
| CN | 102307944 A | 1/2012 |
| CN | 102339965 A | 2/2012 |
| CN | 102372856 A | 3/2012 |
| CN | 102651466 A | 8/2012 |
| CN | 103155219 A | 6/2013 |
| CN | 103155220 A | 6/2013 |
| CN | 103474601 A | 12/2013 |
| CN | 103477491 A | 12/2013 |
| CN | 104051776 A | 9/2014 |
| CN | 104241574 A | 12/2014 |
| CN | 105322120 A | 2/2016 |
| EP | 0834941 A1 | 4/1998 |
| JP | S51017274 A | 2/1976 |
| JP | H06104736 B2 | 12/1994 |
| JP | H09161778 A | 6/1997 |
| JP | H11016561 A | 1/1999 |
| JP | H11040129 A | 2/1999 |
| JP | H1186844 A | 3/1999 |
| JP | H11120994 A | 4/1999 |
| JP | H11130900 A | 5/1999 |
| JP | H11300180 A | 11/1999 |
| JP | 2001118558 A | 4/2001 |
| JP | 2001351616 A | 12/2001 |
| JP | 2002265658 A | 9/2002 |
| JP | 2004087209 A | 3/2004 |
| JP | 2005135659 A | 5/2005 |
| JP | 2005179562 A | 7/2005 |
| JP | 2005200623 A | 7/2005 |
| JP | 2005222773 A | 8/2005 |
| JP | 2005343957 A | 12/2005 |
| JP | 2006066243 A | 3/2006 |
| JP | 2007048581 A | 2/2007 |
| JP | 2008062229 A | 3/2008 |
| JP | 2008123996 A | 5/2008 |
| JP | 4247027 B2 | 4/2009 |
| JP | 2009104967 A | 5/2009 |
| JP | 2009185093 A | 8/2009 |
| JP | 2009218198 A | 9/2009 |
| JP | 2009256404 A | 11/2009 |
| JP | 2009259605 A | 11/2009 |
| JP | 2010118312 A | 5/2010 |
| JP | 2010157361 A | 7/2010 |
| JP | 2010232088 A | 10/2010 |
| JP | 2010540744 A | 12/2010 |
| JP | 201177014 A | 4/2011 |
| JP | 4773064 B2 | 9/2011 |
| JP | 201276255 A | 4/2012 |
| JP | 2012104422 A | 5/2012 |
| JP | 2012150972 A | 8/2012 |
| JP | 5085581 B2 | 11/2012 |
| JP | 2012227066 A | 11/2012 |
| JP | 2012256528 A | 12/2012 |
| JP | 5164296 B2 | 3/2013 |
| JP | 2013046998 A | 3/2013 |
| JP | 2013171629 A | 9/2013 |
| JP | 5302456 B1 | 10/2013 |
| JP | 2013218875 A | 10/2013 |
| JP | 5355823 B1 | 11/2013 |
| JP | 2013234263 A | 11/2013 |
| JP | 5432417 B2 | 3/2014 |
| JP | 5553165 B2 | 7/2014 |
| JP | 2014213500 A | 11/2014 |
| JP | 2015111461 A | 6/2015 |
| JP | 2015120835 A | 7/2015 |
| JP | 2015122234 A | 7/2015 |
| JP | 5876616 B1 | 3/2016 |
| JP | 2016040354 A | 3/2016 |
| JP | 2016051695 A | 4/2016 |
| JP | 2016066755 A | 4/2016 |
| JP | 2016071969 A | 5/2016 |
| JP | 5932161 B1 | 6/2016 |
| JP | 6012838 B1 | 10/2016 |
| JP | 6025957 B1 | 11/2016 |
| JP | 6153992 B2 | 6/2017 |
| JP | 2017103041 A | 6/2017 |
| JP | 2017103042 A | 6/2017 |
| JP | 2017103046 A | 6/2017 |
| JP | 2017103204 A | 6/2017 |
| JP | 2017103209 A | 6/2017 |
| JP | 2017107848 A | 6/2017 |
| JP | 2017142917 A | 8/2017 |
| JP | 2017168419 A | 9/2017 |
| JP | 2017226117 A | 12/2017 |
| JP | 2017226120 A | 12/2017 |
| JP | 2017226121 A | 12/2017 |
| JP | 2017226122 A | 12/2017 |
| JP | 2017228404 A | 12/2017 |
| KR | 20060072065 A | 6/2006 |
| KR | 20060101541 A | 9/2006 |
| KR | 20060118668 A | 11/2006 |
| KR | 20090037552 A | 4/2009 |
| KR | 20120003864 A | 1/2012 |
| KR | 20120128612 A | 11/2012 |
| KR | 20130031319 A | 3/2013 |
| KR | 20130036043 A | 4/2013 |
| KR | 101430975 B1 | 8/2014 |
| KR | 20140112668 A | 9/2014 |
| KR | 20140113186 A | 9/2014 |
| KR | 20140114428 A | 9/2014 |
| KR | 101479749 B1 | 1/2015 |
| KR | 20150020667 A | 2/2015 |
| KR | 20150032555 A | 3/2015 |
| KR | 101510972 B1 | 4/2015 |
| KR | 20150083839 A | 7/2015 |
| KR | 20150119836 A | 10/2015 |
| KR | 20160002173 A | 1/2016 |
| KR | 20160014616 A | 2/2016 |
| KR | 20160016805 A | 2/2016 |
| KR | 20160038918 A | 4/2016 |
| KR | 20160094846 A | 8/2016 |
| KR | 20170031794 A | 3/2017 |
| TW | 201523980 A | 6/2015 |
| WO | 9859384 A1 | 12/1998 |
| WO | 2007119850 A1 | 10/2007 |
| WO | 2008018181 A1 | 2/2008 |
| WO | 2010089939 A1 | 8/2010 |
| WO | 2012090632 A1 | 7/2012 |
| WO | 2012137375 A1 | 10/2012 |
| WO | 2013073503 A1 | 5/2013 |
| WO | 2013099539 A1 | 7/2013 |
| WO | 2013133074 A1 | 9/2013 |
| WO | 2015099190 A1 | 7/2015 |
| WO | 2015141477 A1 | 9/2015 |
| WO | 2016104792 A1 | 6/2016 |
| WO | 2016152863 A1 | 9/2016 |

OTHER PUBLICATIONS

Office Action dated Apr. 3, 2018 in JP Application No. 2017243286 (Partial English Translation).

Office Action dated Oct. 2, 2018 in JP Application No. 2017243286 (Partial English Translation).

Kawanishi, K., "Effect of Crystalline Forms of Polyvinylidene fluoride (PVDF) on PVDF Resin Coated Steel Sheet Bendability," The Journal of the Surface Finishing Society of Japan, vol. 48, No. 8, pp. 811-814 (1997).

Obata, J., "Scratch Tester" Technical Sheet No. 13011, Japan, Technology Research Institute of Osaka Prefecture, p. 1-2 (2013).

Office Action dated Aug. 18, 2020 in JP Application No. 2019108158 (with Partial English Translation).

(56) References Cited

OTHER PUBLICATIONS

Office Action dated Sep. 23, 2020 in JP Application No. 2016123055 (Partial English Translation).
Office Action dated Dec. 31, 2018 in U.S. Appl. No. 15/627,736, by Ogata.
Solvay, "Solef PVDF, Design & Processing Guide," pp. 1-64 (2015).
Written Opinion dated Jan. 10, 2017 in International Application No. PCT/JP2016/081481.
International Search Report dated Jan. 10, 2017 in International Application No. PCT/JP2016/081481.
Martins et al., "Electroactive Phases of Poly(Vinylidene Fluoride): Determination, Processing, and Applications," Progress in Polymer Science, vol. 39, pp. 683-706 (2014).
Mohammadi et al., "Effect of Tensile Strain Rate and Elongation on Crystalline Structure and Piezoelectric Properties of PVDF Thin Films" Polymer Testing, vol. 26, pp. 42-50 (2007).
Office Action dated Jan. 13, 2020 in U.S. Appl. No. 15/989,901, by Kurakane.
Office Action dated Mar. 12, 2019 in JP Application No. 2017243278 (Partial English Translation).
Office Action dated Mar. 12, 2019 in JP Application No. 2017243282 (Partial English Translation).
Office Action dated Mar. 28, 2018 in CN Application No. 201610865635.7.
Office Action dated Apr. 3, 2018 in JP Application No. 2017243277 (Partial English Translation).
Office Action dated Apr. 3, 2018 in JP Application No. 2017243278 (Partial English Translation).
Office Action dated Apr. 3, 2018 in JP Application No. 2017243280 (Partial English Translation).
Office Action dated Apr. 3, 2018 in JP Application No. 2017243282.
Office Action dated Apr. 3, 2018 in JP Application No. 2017243284 (Partial English Translation).
Office Action dated Apr. 3, 2018 in JP Application No. 2017243289.
Office Action dated Apr. 3, 2018 in JP Application No. 2017243292 (Partial English Translation).
Office Action dated Apr. 10, 2018 in JP Application No. 2017243290 (Partial English Translation).
Office Action dated Apr. 10, 2018 in JP Application No. 2017243293 (Partial English Translation).
Office Action dated Apr. 10, 2019 in U.S. Appl. No. 15/627,585, by Ogata.
Office Action dated Apr. 19, 2017 in KR Application No. 1020160077240.
Office Action dated May 16, 2017 in JP Application No. 2017033720 (Partial English Translation).
Office Action dated Jun. 10, 2020 in U.S. Appl. No. 16/223,737, by Arise.
Office Action dated Jun. 15, 2017 in U.S. Appl. No. 15/398,231, by Ogata.
Office Action dated Jun. 19, 2018 in KR Application No. 1020180060097.
Office Action dated Jun. 28, 2016 in JP Application No. 2016024163 (Partial English Translation).
Office Action dated Jul. 29, 2016 in KR Application No. 1020160077240.
Office Action dated Aug. 4, 2020 in U.S. Appl. No. 16/224,014, by Kashiwazaki.
Office Action dated Aug. 4, 2020 in U.S. Appl. No. 16/224,111, by Arise.
Office Action dated Aug. 13, 2020 in U.S. Appl. No. 16/224,788, by Arise.
Office Action dated Aug. 18, 2017 in KR Application No. 1020170041366.
Office Action dated Aug. 18, 2017 in KR Application No. 1020170041590.
Office Action dated Aug. 18, 2017 in KR Application No. 1020170041595.
Office Action dated Aug. 18, 2017 in KR Application No. 1020170041604.
Office Action dated Aug. 18, 2017 in KR Application No. 1020170041611.
Office Action dated Aug. 23, 2016 in JP Application No. 2016127005.
Office Action dated Aug. 29, 2019 in KR Application No. 1020197013298 (Partial English Translation).
Office Action dated Aug. 30, 2017 in CN Application No. 201611225799.X.
Office Action dated Sep. 20, 2018 in U.S. Appl. No. 15/627,629, by Ogata.
Office Action dated Sep. 28, 2016 in KR Application No. 1020160087266.
Office Action dated Oct. 2, 2018 in JP Application No. 2017243278 (Partial English Translation).
Office Action dated Oct. 2, 2018 in JP Application No. 2017243282.
Office Action dated Oct. 2, 2018 in JP Application No. 2017243289.
Office Action dated Oct. 2, 2018 in JP Application No. 2017243290 (Partial English Translation).
Office Action dated Oct. 22, 2018 in U.S. Appl. No. 15/627,556, by Ogata.
Office Action dated Oct. 22, 2018 in U.S. Appl. No. 15/627,664, by Ogata.
Office Action dated Oct. 22, 2018 in U.S. Appl. No. 15/627,671, by Ogata.
Office Action dated Oct. 24, 2018 in U.S. Appl. No. 15/627,804, by Ogata.
Office Action dated Nov. 29, 2016 in JP Application No. 2016024163 (Partial English Translation).
Office Action dated Dec. 6, 2016 in JP Application No. 2016127005.
Office Action dated Dec. 20, 2018 in U.S. Appl. No. 15/627,585, by Ogata.
Office Action dated Dec. 21, 2016 in KR Application No. 1020160077240.
Office Action dated Dec. 30, 2019 in U.S. Appl. No. 16/223,737, by Arise.
Office Action dated Feb. 2, 2021 in CN Application No. 201710467490.X.
Office Action dated Mar. 10, 2021 in CN Application No. 201710472303.7.
Office Action dated Dec. 22, 2020 in CN Application No. 201710472390.6.
Office Action dated Dec. 21, 2020 in CN Application No. 201710472456.1.
Office Action dated Dec. 14, 2020 in U.S. Appl. No. 16/224,788, by ARISE.
Office Action dated Jan. 21, 2021 in U.S. Appl. No. 16/224,777, by KURAKANE.
Office Action dated Jan. 21, 2021 in U.S. Appl. No. 16/224,767, by KURAKANE.
Office Action dated Jun. 23, 2021 in U.S. Appl. No. 16/224,767, by KURAKANE.
Office Action dated Aug. 23, 2021 in CN Application No. 201710472303.7.

\* cited by examiner

NONAQUEOUS ELECTROLYTE SECONDARY BATTERY

This Nonprovisional application claims priority under 35 U.S.C. § 119 on Patent Application No. 2017-243286 filed in Japan on Dec. 19, 2017, the entire contents of which is hereby incorporated by reference.

TECHNICAL FIELD

The present invention relates to a nonaqueous electrolyte secondary battery.

BACKGROUND ART

Nonaqueous electrolyte secondary batteries, in particular, lithium secondary batteries have a high energy density, and are thus in wide use as batteries for a personal computer, a mobile telephone, a portable information terminal, and the like. Such nonaqueous electrolyte secondary batteries have recently been developed as on-vehicle batteries.

For example, Patent Literature 1 discloses a nonaqueous electrolyte secondary battery which includes a separator having a temperature rise ending period that falls within a specific range when the separator is irradiated with a microwave.

CITATION LIST

Patent Literature

Patent Literature 1: Japanese Patent No. 6012838 (Publication Date: Oct. 25, 2016)

SUMMARY OF INVENTION

Technical Problem

An object to be attained by an aspect of the present invention is to provide a nonaqueous electrolyte secondary battery in which a decrease in discharge capacity after a charge-discharge cycle is reduced.

Solution to Problem

The present invention encompasses the following features.

<1> A nonaqueous electrolyte secondary battery in accordance with an aspect of the present invention includes: a nonaqueous electrolyte secondary battery separator including a polyolefin porous film; a porous layer containing a polyvinylidene fluoride-based resin; a positive electrode plate of which a value represented by Formula (1) below falls within a range of not less than 0.00 and not more than 0.50; and a negative electrode plate of which a value represented by Formula (1) below falls within a range of not less than 0.00 and not more than 0.50, $$|1-T/M| \tag{1}$$

where T represents a critical load distance in a TD in a scratch test under a constant load of 0.1 N, and M represents a critical load distance in an MD in a scratch test under a constant load of 0.1 N, the polyolefin porous film having a temperature rise ending period of 2.9 seconds·m$^2$/g to 5.7 seconds·m$^2$/g with respect to an amount of resin per unit area in a case where the polyolefin porous film has been impregnated with N-methylpyrrolidone containing 3% by weight of water and has then been irradiated with a microwave having a frequency of 2455 MHz and an output of 1800 W, the porous layer being provided between the nonaqueous electrolyte secondary battery separator and at least one of the positive electrode plate and the negative electrode plate, the polyvinylidene fluoride-based resin contained in the porous layer containing an α-form polyvinylidene fluoride-based resin in an amount of not less than 35.0 mol % with respect to 100 mol % of a combined amount of the α-form polyvinylidene fluoride-based resin and a α-form polyvinylidene fluoride-based resin contained in the polyvinylidene fluoride-based resin, a content of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

<2> The nonaqueous electrolyte secondary battery which is described in <1> and in which the positive electrode plate contains a transition metal oxide.

<3> The nonaqueous electrolyte secondary battery which is described in <1> or <2> and in which the negative electrode plate contains graphite.

<4> The nonaqueous electrolyte secondary battery which is described in any one of <1> through <3>, further including: another porous layer which is provided between (i) the nonaqueous electrolyte secondary battery separator and (ii) at least one of the positive electrode plate and the negative electrode plate.

<5> The nonaqueous electrolyte secondary battery which is described in <4> and in which the another porous layer contains at least one resin selected from the group consisting of a polyolefin, a (meth)acrylate-based resin, a polyamide-based resin, a fluorine-containing resin (excluding a polyvinylidene fluoride-based resin), a polyester-based resin and a water-soluble polymer.

<6> The nonaqueous electrolyte secondary battery which is described in <5> and in which the polyamide-based resin is an aramid resin.

Advantageous Effects of Invention

According to an aspect of the present invention, it is possible to provide the nonaqueous electrolyte secondary battery in which a decrease in discharge capacity after a charge-discharge cycle is reduced.

DESCRIPTION OF EMBODIMENTS

Figure 1:
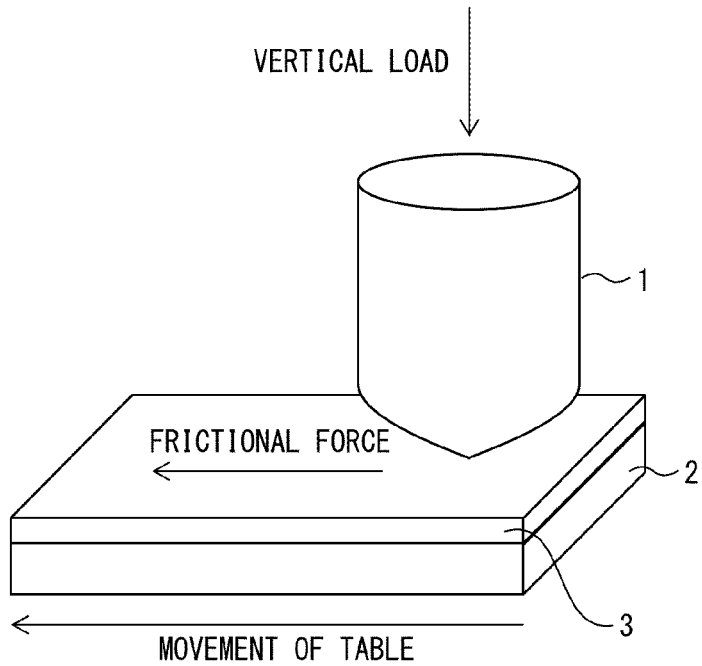
FIG. 1 is a diagram illustrating (i) a device used in a scratch test in accordance with an embodiment of the present invention and (ii) an operation of the device.

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

[1. Nonaqueous Electrolyte Secondary Battery in Accordance with an Aspect of the Present Invention]

A nonaqueous electrolyte secondary battery in accordance with an aspect of the present invention includes (i) a separator for a nonaqueous electrolyte secondary battery (hereinafter referred to as a "nonaqueous electrolyte secondary battery separator") including a polyolefin porous film (hereinafter sometimes referred to as "porous film"), (ii) a porous layer containing a polyvinylidene fluoride-based resin, (iii) a positive electrode plate of which a value represented by Formula (1) below falls within a range of not less than 0.00 and not more than 0.50, and (iv) a negative electrode plate of which a value represented by Formula (1) below falls within a range of not less than 0.00 and not more than 0.50, $$|1-T/M| \qquad (1)$$

where T represents a critical load distance in a TD in a scratch test under a constant load of 0.1 N, and M represents a critical load distance in an MD in a scratch test under a constant load of 0.1 N, the porous film having a temperature rise ending period of 2.9 seconds·m$^2$/g to 5.7 seconds·m$^2$/g with respect to an amount of resin per unit area in a case where the porous film has been impregnated with N-methylpyrrolidone containing 3% by weight of water and has then been irradiated with a microwave having a frequency of 2455 MHz and an output of 1800 W, the porous layer being provided between the nonaqueous electrolyte secondary battery separator and at least one of the positive electrode plate and the negative electrode plate, the polyvinylidene fluoride-based resin contained in the porous layer containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin contained in the polyvinylidene fluoride-based resin, a content of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

The positive electrode plate and the negative electrode plate, which show results of the scratch test falling within the above described range, have small anisotropy in critical load distance (i.e., the critical load distance is isotropic). Therefore, during a charge and discharge process, a stress is evenly applied to an entire electrode active material layer. Consequently, adhesiveness (i.e., adhesiveness between an active material, an electrically conductive agent, and a binding agent) inside the electrode active material layer is easily maintained, and adhesiveness between the electrode active material layer and a current collecting foil is easily maintained.

In the porous film having the temperature rise ending period that falls within the above described range when being irradiated with a microwave, a structure (i.e., capillary force in pores and an area of a wall of the pores) of the pores existing in the porous film falls within a specific range. In addition, such a porous film has a sufficiently high capability to supply an electrolyte from the porous film to the electrodes. As a result, drying up of the electrolyte in the pores and blockage of the pores are prevented.

The porous layer in which a rate of content of an α-form polyvinylidene fluoride-based resin in the polyvinylidene fluoride-based resin falls within the above described range can inhibit plastic deformation of the polyvinylidene fluoride-based resin at a high temperature. As a result, structural deformation of the porous layer and blockage of voids in the porous layer are prevented.

By selecting the above constituent members, the nonaqueous electrolyte secondary battery in accordance with an aspect of the present invention brings about a novel effect of reducing a decrease in discharge capacity after a charge-discharge cycle. As a specific example, in the nonaqueous electrolyte secondary battery in accordance with an aspect of the present invention, a decrease in discharge capacity at 1 C after a charge-discharge cycle is reduced, as compared with a conventional nonaqueous electrolyte secondary battery.

According to the nonaqueous electrolyte secondary battery in accordance with an aspect of the present invention, a decreasing rate of the discharge capacity at 1 C after a charge-discharge cycle is preferably not higher than 13.0%, more preferably not higher than 12.5%.

Note that the decreasing rate of the discharge capacity at 1 C after a charge-discharge cycle can be calculated by the following procedures (1) through (5):

(1) Initial Charge and Discharge

A new nonaqueous electrolyte secondary battery, which has not been subjected to a charge-discharge cycle, is subjected to 4 initial charge-discharge cycles at 25° C. Each of the 4 charge-discharge cycles is carried out (i) at a voltage ranging from 2.7 V to 4.1 V, (ii) with CC—CV charge at a charge current value of 0.2 C (where the terminal current condition is 0.02 C), and (iii) with CC discharge at a discharge current value of 0.2 C. Here, 1 C is a value of an electric current at which a battery rated capacity defined as a one-hour rate discharge capacity is discharged in one hour. The "CC—CV charge" is a charging method in which (i) a battery is charged at a predetermined constant electric current and, (ii) after a certain voltage is reached, the certain voltage is maintained while the electric current is being reduced. The "CC discharge" is a discharging method in which a battery is discharged at a predetermined constant electric current until a certain voltage is reached. The meanings of those terms apply hereinafter.

(2) Test of Discharge Capacity at 1 C Before Cycle Test

The nonaqueous electrolyte secondary battery which has been subjected to the above (1) is subjected to a charge-discharge cycle carried out (i) at a voltage ranging from 2.7 V to 4.2 V, (ii) with CC—CV charge at a charge current value of 1 C (where the terminal current condition is 0.02 C), and (iii) with CC discharge at a discharge current value of 1 C. A measured value is determined as a discharge capacity at 1 C before cycle test.

(3) Cycle Test

The nonaqueous electrolyte secondary battery which has been subjected to the above (2) is subjected to 100 charge-discharge cycles at 55° C. Each of the 100 charge-discharge cycles is carried out (i) at a voltage ranging from 2.7 V to 4.2 V, (ii) with CC—CV charge at a charge current value of 1 C (where the terminal current condition is 0.02 C), and (iii) with CC discharge at a discharge current value of 10 C.

(4) Test of Discharge Capacity at 1 C After Cycle Test

The nonaqueous electrolyte secondary battery which has been subjected to the above (3) is subjected to a charge-discharge cycle carried out (i) at a voltage ranging from 2.7

V to 4.2 V, (ii) with CC—CV charge at a charge current value of 1 C (where the terminal current condition is 0.02 C), and (iii) with CC discharge at a discharge current value of 1 C. A measured value is determined as a discharge capacity at 1 C after cycle test.

(5) Decreasing Rate of Discharge Capacity at 1 C After Cycle

A decreasing rate of the discharge capacity at 1 C after the charge-discharge cycle is calculated in accordance with the following formula:

Decreasing rate (%)={(discharge capacity at 1 C before cycle test−discharge capacity at 1 C after cycle test)/(design capacity)}×100

[2. Positive Electrode Plate and Negative Electrode Plate]

(Positive Electrode Plate)

A positive electrode plate in accordance with an embodiment of the present invention is a positive electrode plate of which a value represented by Formula (1) below is not less than 0.00 and not more than 0.50. Normally, the positive electrode plate is a sheet-shaped positive electrode plate including, (i) as a positive electrode active material layer, a positive electrode mix containing a positive electrode active material, an electrically conductive agent, and a binding agent and (ii) a positive electrode current collector supporting the positive electrode mix thereon. Note that the positive electrode plate may be configured such that the positive electrode current collector supports the positive electrode mix on both surfaces thereof or on one of the surfaces thereof.

$$|1-T/M| \tag{1}$$

where T represents a critical load distance in a TD in a scratch test under a constant load of 0.1 N, and M represents a critical load distance in an MD in a scratch test under a constant load of 0.1 N.

The positive electrode active material is, for example, a material capable of being doped with and dedoped of lithium ions. Such a material is preferably a transition metal oxide. Specific examples of the transition metal oxide include a lithium complex oxide containing at least one transition metal such as V, Mn, Fe, Co, or Ni. Among such lithium complex oxides, (i) a lithium complex oxide having an $\alpha$-NaFeO$_2$ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is further preferably complex lithium nickelate.

Further, the complex lithium nickelate furthermore preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. Among others, an active material that contains Al or Mn and that contains Ni at a proportion of not less than 85%, further preferably not less than 90%, is particularly preferable because a nonaqueous electrolyte secondary battery including a positive electrode plate containing the above active material has an excellent cycle characteristic for use as a high-capacity battery.

Examples of the electrically conductive agent include carbonaceous materials such as natural graphite, artificial graphite, cokes, carbon black, pyrolytic carbons, carbon fiber, and a fired product of an organic polymer compound. The present embodiment may use (i) only one kind of the above electrically conductive agents or (ii) two or more kinds of the above electrically conductive agents in combination, for example a mixture of artificial graphite and carbon black.

Examples of the binding agent include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene copolymer, a vinylidene fluoride-hexafluoropropylene-tetrafluoroethylene copolymer, a thermoplastic polyimide, polyethylene, and polypropylene; an acrylic resin; and styrene-butadiene rubber. The binding agent functions also as a thickening agent.

The positive electrode mix may be prepared by, for example, a method of applying pressure to the positive electrode active material, the electrically conductive agent, and the binding agent on the positive electrode current collector or a method of using an appropriate organic solvent so that the positive electrode active material, the electrically conductive agent, and the binding agent are in a paste form.

Examples of the positive electrode current collector include electric conductors such as Al, Ni, and stainless steel. Among these, Al is preferable as it is easy to process into a thin film and less expensive.

The sheet-shaped positive electrode plate may be produced, that is, the positive electrode mix may be supported by the positive electrode current collector, through, for example, a method of applying pressure to the positive electrode active material, the electrically conductive agent, and the binding agent on the positive electrode current collector to form a positive electrode mix on the positive electrode current collector or a method of (i) using an appropriate organic solvent so that the positive electrode active material, the electrically conductive agent, and the binding agent are in a paste form to provide a positive electrode mix, (ii) applying the positive electrode mix to the positive electrode current collector, (iii) drying the applied positive electrode mix to prepare a sheet-shaped positive electrode mix, and (iv) applying pressure to the sheet-shaped positive electrode mix so that the sheet-shaped positive electrode mix is firmly fixed to the positive electrode current collector.

(Negative Electrode Plate)

A negative electrode plate in accordance with an embodiment of the present invention is a negative electrode plate of which a value represented by Formula (1) below is not less than 0.00 and not more than 0.50. Normally, the negative electrode plate is a sheet-shaped negative electrode plate including, (i) as a negative electrode active material layer, a negative electrode mix containing a negative electrode active material and (ii) a negative electrode current collector supporting the negative electrode mix thereon. Note that the negative electrode plate may be configured such that the negative electrode current collector supports the negative electrode mix on both surfaces thereof or on one of the surfaces thereof.

$$|1-T/M| \tag{1}$$

where T represents a critical load distance in the TD in a scratch test under a constant load of 0.1 N, and M represents a critical load distance in the MD in a scratch test under a constant load of 0.1 N.

The sheet-shaped negative electrode plate preferably contains the above electrically conductive agent and binding agent.

Examples of the negative electrode active material include (i) a material capable of being doped with and dedoped of lithium ions, (ii) lithium metal, and (iii) lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped with and dedoped of lithium ions at an electric potential lower than that for the positive electrode plate; metals such as aluminum (Al), lead (Pb), tin (Sn), bismuth (Bi), or silicon (Si), each of which is alloyed with alkali metal; an intermetallic compound (AlSb, $Mg_2Si$, $NiSi_2$) of a cubic system in which intermetallic compound alkali metal can be inserted in voids in a lattice; and a lithium nitrogen compound ($Li_{3-x}M_xN$ (where M represents a transition metal)). Of the above negative electrode active materials, a negative electrode active material containing graphite is preferable, and a carbonaceous material that contains, as a main component, a graphite material such as natural graphite or artificial graphite is more preferable. This is because such graphite and a carbonaceous material are high in potential evenness, and a great energy density can be obtained in a case where the graphite or carbonaceous material, which is low in average discharge potential, is combined with the positive electrode plate. The negative electrode active material may alternatively be a mixture of graphite and silicon, preferably containing Si at a proportion of not less than 5%, more preferably not less than 10%, with respect to carbon (C) in the graphite.

The negative electrode mix may be prepared by, for example, a method of applying pressure to the negative electrode active material on the negative electrode current collector or a method of using an appropriate organic solvent so that the negative electrode active material is in a paste form.

Examples of the negative electrode current collector include Cu, Ni, and stainless steel. Among these, Cu is preferable as it is not easily alloyed with lithium particularly in a lithium-ion secondary battery and is easily processed into a thin film.

The sheet-shaped negative electrode plate may be produced, that is, the negative electrode mix may be supported by the negative electrode current collector, through, for example, a method of applying pressure to the negative electrode active material on the negative electrode current collector to form a negative electrode mix on the negative electrode current collector or a method of (i) using an appropriate organic solvent so that the negative electrode active material is in a paste form to provide a negative electrode mix, (ii) applying the negative electrode mix to the negative electrode current collector, (iii) drying the applied negative electrode mix to prepare a sheet-shaped negative electrode mix, and (iv) applying pressure to the sheet-shaped negative electrode mix so that the sheet-shaped negative electrode mix is firmly fixed to the negative electrode current collector. The above paste preferably includes the above electrically conductive agent and binding agent.

(Scratch Test)

The "scratch test" in the present invention is a test for measuring a stress that is generated in a certain indenter moving distance when a constant load is applied to an indenter and a measurement target object (such as a positive electrode plate and a negative electrode plate) is moved in a horizontal direction in a state in which a surface layer of the measurement target object is subjected to compressive deformation in a thickness direction (i.e., in a state in which the indenter is pressed onto the surface layer of the measurement target object) (see FIG. 1). Specifically, the scratch test is carried out as follows:

(1) A measurement target object 3 (which is a positive electrode plate or a negative electrode plate) is cut into a piece having a size of 20 mm×60 mm. Then, a diluted glue solution which has been obtained by diluting Arabic Yamato aqueous liquid glue (manufactured by YAMATO Co., Ltd.) with water by a 5-fold dilution factor is applied to an entire surface of a glass preparation (substrate 2) of 30 mm×70 mm so that a weight per unit area of the diluted glue solution is approximately 1.5 $g/m^2$. The measurement target object 3 which has been cut into a piece and the substrate 2 are bonded together via the applied aqueous liquid glue, and are then dried a whole day and night at a temperature of 25° C. Thus, a test sample is prepared. Note that, when the measurement target object 3 and the glass preparation (substrate 2) are bonded together, attention needs to be paid to prevent gas bubbles from entering between the measurement target object 3 and the glass preparation (substrate 2). Note that, in a case where the measurement target object 3 is an electrode plate (i.e., a positive electrode plate or a negative electrode plate), a resulting test sample is prepared in such a manner that an active material layer (i.e., a positive electrode active material layer or a negative electrode active material layer) of the electrode plate serves as an upper surface of the test sample which upper surface is to come into contact with a diamond indenter 1 (described later).

(2) The test sample prepared in the step (1) is placed on a microscratch testing device (manufactured by CSEM Instruments). The diamond indenter 1 (having a conical shape with a vertex angle of 120° and a tip radius of 0.2 mm) of the testing device is placed on the test sample while a vertical load of 0.1 N is applied, and a table of the testing device is moved in that state by a distance of 10 mm at a speed of 5 mm/min in the TD of the measurement target object. During the movement of the table, a stress (frictional force) generated between the diamond indenter 1 and the test sample is measured.

Figure 2:
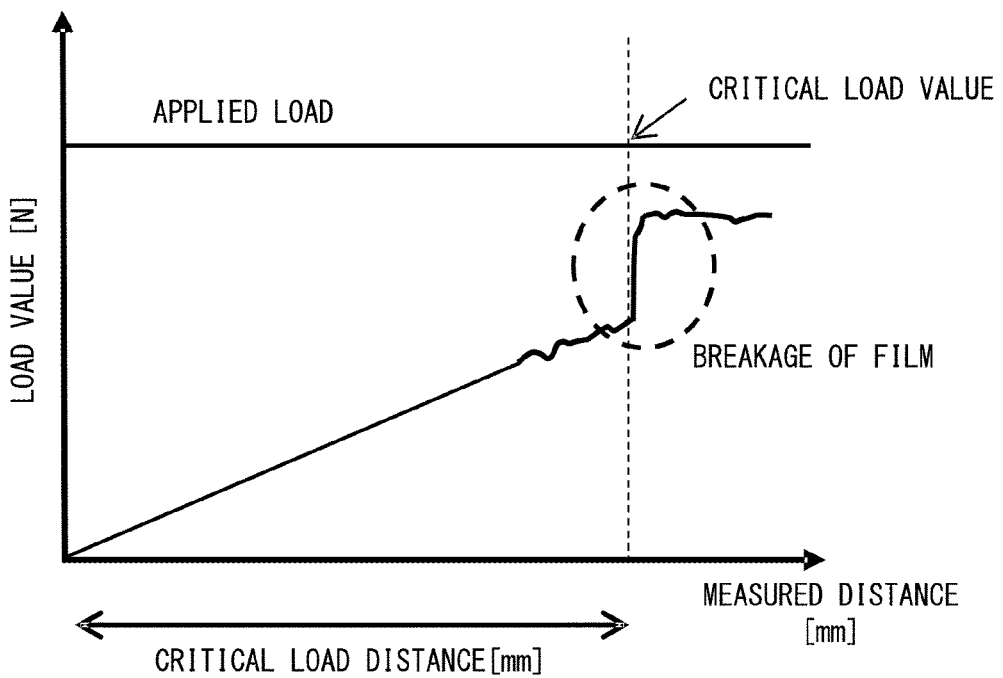
FIG. 2 is a diagram illustrating a critical load and a critical load distance in a graph prepared from results of the scratch test in an embodiment of the present invention.

(3) A curve graph is made, which shows a relationship between a displacement of the stress measured in the step (2) and the moving distance of the table. Then, based on the curve graph, the followings are calculated as illustrated in FIG. 2: (i) a critical load value in the TD and (ii) a distance (critical load distance) in the TD between a starting point of measurement and a point where the critical load is obtained.

(4) The direction of movement of the table is changed to the MD, and the above steps (1) through (3) are repeated. Then, the followings are calculated: (i) a critical load value in the MD and (ii) a distance (critical load distance) in the MD between a starting point of measurement and a point where the critical load is obtained.

Note that any conditions and the like for the measurement in the scratch test other than the conditions described above are similar to those described in JIS R 3255.

The "MD" as used herein refers to a lengthwise direction of a positive electrode plate and a negative electrode plate, and the "TD" as used herein refers to a direction orthogonal to the MD. Note, however, that in a case where a positive electrode plate or a negative electrode plate is shaped in a square, the MD is a direction which is parallel to any of edges of the square, and the TD is a direction orthogonal to the MD.

(Interpretation of Results of Scratch Test and Control Method)

The scratch test which is conducted (i) models stress transfer inside an electrode active material layer (electrode active material particles (positive electrode active material particles or negative electrode active material particles)) due to expansion and shrinkage of the electrode active material layer along with charge/discharge of a nonaqueous electrolyte secondary battery into which the electrode plate is incorporated, and (ii) measures and calculates uniformity of the stress transfer.

Further, in the scratch test, a measured critical load distance is affected by uniformity of a surface layer (electrode active material layer) of the electrode plate, the degree of alignment of particles present on a surface of the electrode active material layer of the electrode plate, the shape of the particles (e.g., aspect ratio of the particles), and the particle diameter of the particles.

Here, a positive electrode plate in accordance with an embodiment of the present invention has a value represented by the following Formula (1), which value is in a range of not less than 0.00 to not more than 0.50, preferably not less than 0.00 to not more than 0.47, more preferably not less than 0.00 to not more than 0.45.

Further, a negative electrode plate in accordance with an embodiment of the present invention has a value represented by the following Formula (1), which value is in a range of not less than 0.00 to not more than 0.50, preferably not less than 0.00 to not more than 0.49, more preferably not less than 0.00 to not more than 0.45:

$$|1-T/M| \qquad (1)$$

where T represents the critical load distance in the TD in a scratch test under a constant load of 0.1 N, and M represents the critical load distance in the MD in a scratch test under a constant load of 0.1 N.

The values represented by the Formula (1) are each a value representing anisotropy of a critical load distance in a scratch test on each electrode plate. A value that is closer to zero indicates that the critical load distance is more isotropic.

Hence, an electrode plate which has a value beyond 0.50 as represented by the Formula (1) shows that there exists large anisotropy between a critical load distance in the TD and a critical load distance in the MD. An electrode plate having the large anisotropy described above has a small surface uniformity. This may cause, when the nonaqueous electrolyte secondary battery is assembled, insufficient adhesiveness between (i) the electrode plate and (ii) the nonaqueous electrolyte secondary battery separator and the porous layer and may cause insufficient plane direction-uniformity in electrode-to-electrode distance.

In a nonaqueous electrolyte secondary battery including an electrode plate having the large anisotropy, stress is transferred nonuniformly inside an electrode active material layer due to expansion and shrinkage of electrode active material particles along with charge/discharge of the nonaqueous electrolyte secondary battery. This causes voids inside the electrode active material layer to have nonuniform diameters and to be distributed nonuniformly, and also causes stress inside the electrode active material layer to occur in a localized direction. This results in, during a charge-discharge cycle, disconnection of an electrically conductive path inside the electrode active material layer, separation of an electrode active material and an electrically conductive agent from a binding agent (binder), and decrease in adhesiveness between a current collector and the electrode active material layer.

For the above reasons, in a case where an electrode plate whose value represented by Formula (1) is not less than 0 and not more than 0.50 is employed as a constituent member, the nonaqueous electrolyte secondary battery in accordance with an embodiment of the present invention brings about the effect of reducing a decrease in discharge capacity after a charge-discharge cycle.

Examples of a method by which a value represented by Formula (1) is adjusted for an electrode plate (i.e., a positive electrode plate and a negative electrode plate) encompass: a method of adjusting a particle diameter of electrode active material particles, which serve as a material for an electrode plate, and/or an aspect ratio of the electrode active material particles; a method of applying a coating of an electrode mix (i.e., a positive electrode mix or a negative electrode mix) onto a current collector at a specific coating shear rate during formation of an electrode plate, to adjust an alignment property of electrode active material particles and/or a porosity of a resulting electrode active material layer; and a method of adjusting a compounding ratio at which an electrode active material, an electrically conductive agent, and a binding agent, which are materials for an electrode plate, are mixed to control a composition ratio of a resulting electrode plate (electrode active material layer).

Among the above methods, specifically, the followings are preferable: that is, controlling the particle diameter of the electrode active material particles to fall within a range of 1 μm to 30 μm, controlling the aspect ratio (long diameter-to-short diameter ratio) of the electrode active material particles to fall within a range of 1 to 5, controlling a coating line speed (that is, a speed at which a current collector is coated with an active material; hereinafter also referred to as "coating speed") to fall within a range of 10 m/min to 200 m/min, controlling the porosity of the electrode plate (porosity of the electrode active material layer) to fall within a range of 10% to 50%, and controlling a proportion of an active material component present in a composition of an electrode plate to fall within a range of equal to or greater than 80% by weight. By controlling the respective production conditions and the like described above to fall within suitable ranges, it is possible to suitably control a value represented by Formula (1) for an electrode plate to fall within a range of 0.00 to 0.50.

A porosity ($\varepsilon$) of an electrode active material layer can be calculated, by the formula below, from a density p (g/m$^3$) of an electrode active material layer, respective mass compositions (wt %) $b^1$, $b^2$, ... $b^n$ of materials that constitute the electrode active material layer (e.g., a positive electrode active material, an electrically conductive agent, a binding agent, and others), and respective real densities (g/m$^3$) $c^1$, $c^2$, ... $c^n$ of these materials. Note here that the real densities of the materials may be literature data or may be measured values obtained by a pycnometer method.

$$\varepsilon = 1 - \{p \times (b^1/100)/c^1 + p \times (b^2/100)/c^2 + p \times (b^n/100)/c^n\} \times 100$$

[3. Nonaqueous Electrolyte Secondary Battery Separator]

The nonaqueous electrolyte secondary battery separator in accordance with an embodiment of the present invention includes a polyolefin porous film.

The porous film may by itself serve as a nonaqueous electrolyte secondary battery separator. The porous film itself can also be a base material of a nonaqueous electrolyte secondary battery laminated separator in which a porous layer (described later) is disposed on the porous film. The porous film contains polyolefin as a main component and has a large number of pores connected to one another, and allows a gas or a liquid to pass therethrough from one surface to the other.

The nonaqueous electrolyte secondary battery separator in accordance with an embodiment of the present invention may be provided with a porous layer (described later) that contains a polyvinylidene fluoride-based resin and is disposed on at least one surface of the nonaqueous electrolyte secondary battery separator. This laminated body, in which the porous layer is disposed on at least one surface of the nonaqueous electrolyte secondary battery separator, is referred to in the present specification as a "nonaqueous electrolyte secondary battery laminated separator" or a "laminated separator". Further, the nonaqueous electrolyte secondary battery separator in accordance with an embodiment of the present invention may include, in addition to a polyolefin porous film, another layer(s) such as an adhesive layer, a heat-resistant layer, and/or a protective layer.

The porous film contains a polyolefin at a proportion of not less than 50% by volume, preferably not less than 90% by volume, more preferably not less than 95% by volume, relative to the entire porous film. The polyolefin preferably contains a high molecular weight component having a weight-average molecular weight within a range of $5\times10^5$ to $15\times10^6$. In particular, the polyolefin more preferably contains a high molecular weight component having a weight-average molecular weight of not less than 1,000,000 because such a polyolefin allows the nonaqueous electrolyte secondary battery separator to have a higher strength.

Specific examples of the polyolefin (thermoplastic resin) include a homopolymer or a copolymer each produced by (co)polymerizing a monomer such as ethylene, propylene, 1-butene, 4-methyl-1-pentene, or 1-hexene. Examples of the homopolymer include polyethylene, polypropylene, and polybutene. Examples of the copolymer include an ethylene-propylene copolymer.

Among the above examples, polyethylene is preferable as it is capable of preventing (shutting down) a flow of an excessively large electric current at a lower temperature. Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous film has a film thickness of preferably 4 μm to 40 μm, more preferably 5 μm to 30 μm, still more preferably 6 μm to 15 μm.

The porous film only needs to have a weight per unit area which weight is determined as appropriate in view of the strength, film thickness, weight, and handleability of the separator. Note, however, that the porous film has a weight per unit area of preferably 4 $g/m^2$ to 20 $g/m^2$, more preferably 4 $g/m^2$ to 12 $g/m^2$, still more preferably 5 $g/m^2$ to 12 $g/m^2$, so as to allow a nonaqueous electrolyte secondary battery that includes a nonaqueous electrolyte secondary battery laminated separator including the porous film to have a higher weight energy density and a higher volume energy density.

The porous film has an air permeability of preferably 30 sec/100 mL to 500 sec/100 mL, more preferably 50 sec/100 mL to 300 sec/100 mL, in terms of Gurley values. A porous film having an air permeability within the above range can have sufficient ion permeability.

The porous film has a porosity of preferably 20% by volume to 80% by volume, more preferably 30% by volume to 75% by volume, so as to (i) retain a larger amount of electrolyte and (ii) obtain the function of reliably preventing (shutting down) a flow of an excessively large electric current at a lower temperature. Further, in order to obtain sufficient ion permeability and prevent particles from entering the positive electrode and/or the negative electrode, the porous film has pores each having a diameter of preferably not larger than 0.3 μm, more preferably not larger than 0.14 μm.

(Temperature Rise Ending Period of Porous Film)

Irradiating a porous film containing N-methylpyrrolidone containing water with a microwave causes the porous film to generate heat due to vibrational energy of the water. The heat generated is transferred to the resin contained in the porous film which resin is in contact with the N-methylpyrrolidone containing water. The temperature rise ends when equilibrium is reached between (i) the rate of heat generation and (ii) the rate of cooling due to transfer of heat to the resin. This indicates that the temperature rise ending period is related to the degree of contact between (i) the liquid contained in the porous film (in this example, N-methylpyrrolidone containing water) and (ii) the resin contained in the porous film. The degree of contact between the liquid contained in the porous film and the resin contained in the porous film is closely related to the capillary force in the pores of the porous film and the area of the wall of the pores. Thus, the temperature rise ending period can be used for evaluation of the structure of pores of a porous film. Specifically, a shorter temperature rise ending period indicates that the capillary force in the pores is larger and that the area of the wall of the pores is larger.

The degree of contact between the liquid contained in the porous film and the resin contained in the porous film is presumably larger in a case where the liquid moves more easily through the pores of the porous film. This makes it possible to use the temperature rise ending period for evaluation of the capability to supply an electrolyte from the porous film to the electrodes. Specifically, a shorter temperature rise ending period indicates a higher capability to supply an electrolyte from the porous film to the electrodes.

A porous film in accordance with an aspect of the present invention has a temperature rise ending period of 2.9 seconds·$m^2$/g to 5.7 seconds·$m^2$/g, preferably 2.9 seconds·$m^2$/g to 5.3 seconds·$m^2$/g, with respect to the amount of resin per unit area (weight per unit area). Note that a temperature of the porous film that has been impregnated with N-methylpyrrolidone containing 3% by weight of water falls within a range of 29° C.±1° C. when irradiation with a microwave is initiated. The temperature rise ending period is measured under atmospheric air while an inside temperature of the device is a normal temperature (e.g., 30° C.±3° C.).

If the temperature rise ending period with respect to the amount of resin per unit area is less than 2.9 seconds·$m^2$/g, both the capillary force in the pores of the porous film and the area of the wall of the pores may become excessively large. This may lead to an increase in the stress caused on the wall of the pores when the electrolyte moves through the pores during a charge-discharge cycle and/or during use of the battery with a large electric current. This may in turn block the pores, with the result of degradation in the discharge capacity after the charge-discharge cycle.

If the temperature rise ending period with respect to the amount of resin per unit area is more than 5.7 seconds·m²/g, liquid will move less easily through the pores of the porous film and, in a case where the porous film is used as a separator for a nonaqueous electrolyte secondary battery, the electrolyte will move more slowly near the interface between the porous film and an electrode, with the result of a decrease in the rate characteristic of the battery. In addition, when the battery has been charged and discharged repeatedly, the electrolyte will be more likely dried up locally at the interface between the separator and an electrode or inside the porous film. This may in turn lead to an increase in the internal resistance of the battery, and further cause degradation in the discharge capacity after the charge-discharge cycle.

In a case where the porous film having the temperature rise ending period of 2.9 seconds·m²/g to 5.7 seconds·m²/g with respect to the amount of resin per unit area is employed as a constituent member, the nonaqueous electrolyte secondary battery in accordance with an embodiment of the present invention brings about the effect of reducing a decrease in discharge capacity after a charge-discharge cycle.

Note that, in a case where the porous layer or another layer is disposed on the porous film, physical property values of the porous film, which is included in a laminated body including the porous film and the porous layer or another layer, can be measured after the porous layer or another layer is removed from the laminated body. The porous layer or other layer can be removed from the laminated body by, for example, a method of dissolving the resin of the porous layer or other layer with use of a solvent such as N-methylpyrrolidone or acetone for removal.

The porous film in accordance with an embodiment of the present invention can be produced by, for example, a method as follows:

Specifically, the porous film can be obtained by a method including the steps of (1) obtaining a polyolefin resin composition by kneading (i) ultra-high molecular weight polyethylene, (ii) a low molecular weight polyolefin having a weight-average molecular weight of not more than 10,000, and (iii) a pore forming agent such as calcium carbonate or a plasticizing agent, (2) forming (rolling) a sheet with use of reduction rollers to roll the polyolefin resin composition obtained in the step (1), (3) removing the pore forming agent from the sheet obtained in the step (2), and (4) obtaining a porous film by stretching the sheet obtained in the step (3).

The structure of pores of a porous film (namely, the capillary force of the pores, the area of the wall of the pores, and stress remaining in the porous film) is influenced by the straining rate during the stretching in the step (4) and the temperature during a heat-fixation treatment (annealing treatment) after the stretching per unit thickness of the stretched film (that is, a heat-fixation temperature per unit thickness of the stretched film). Thus, by adjusting the straining rate and the heat-fixation temperature per unit thickness of the stretched film, it is possible to control the structure of the pores of the porous film, and this makes it possible to achieve the temperature rise ending period with respect to the amount of resin per unit area.

Specifically, a porous film included in the nonaqueous electrolyte secondary battery in accordance with an embodiment of the present invention tends to be produced in a case where the straining rate and the heat-fixation temperature per unit thickness of the stretched film have been so adjusted as to fall, on a graph having an X axis indicative of the straining rate and a Y axis indicative of the heat-fixation temperature per unit thickness of the stretched film, within a triangular area having three vertices at (i) 500% per minute and 1.5° C./μm, (ii) 900% per minute and 14.0° C./μm, and (iii) 2500% per minute and 11.0° C./μm. The straining rate and the heat-fixation temperature per unit thickness of the stretched film are preferably so adjusted as to fall within a triangular area having three vertices at (i) 600% per minute and 5.0° C./(ii) 900% per minute and 12.5° C./μm, and (iii) 2500% per minute and 11.0° C./μm.

[4. Porous Layer]

For an embodiment of the present invention, the porous layer is disposed, as a member of a nonaqueous electrolyte secondary battery, between (i) the nonaqueous electrolyte secondary battery separator and (ii) at least one of the positive electrode plate and the negative electrode plate. The porous layer may be present on one surface or both surfaces of the nonaqueous electrolyte secondary battery separator. The porous layer may alternatively be disposed on an active material layer of at least one of the positive electrode plate and the negative electrode plate. The porous layer may alternatively be provided between the nonaqueous electrolyte secondary battery separator and at least one of the positive electrode plate and the negative electrode plate in such a manner as to be in contact with the nonaqueous electrolyte secondary battery separator and the at least one of the positive electrode plate and the negative electrode plate. There may be a single porous layer or two or more porous layers between the nonaqueous electrolyte secondary battery separator and at least one of the positive electrode plate and the negative electrode plate. The porous layer is preferably an insulating porous layer containing a resin.

It is preferable that a resin that may be contained in the porous layer be insoluble in the electrolyte of the battery and be electrochemically stable when the battery is in normal use. In a case where the porous layer is disposed on one surface of the porous film, the porous layer is preferably disposed on that surface of the porous film which surface faces the positive electrode plate of the nonaqueous electrolyte secondary battery, more preferably on that surface of the porous film which surface comes into contact with the positive electrode plate.

The porous layer in an embodiment of the present invention contains a PVDF-based resin, the PVDF-based resin containing an α-form polyvinylidene fluoride-based resin in an amount of not less than 35.0 mol % relative to 100 mol % of the combined amount of the α-form polyvinylidene fluoride-based resin and a β-form polyvinylidene fluoride-based resin contained in the PVDF-based resin.

The content of the α-form polyvinylidene fluoride-based resin is calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

The porous layer contains a large number of pores connected to one another, and thus allows a gas or a liquid to pass therethrough from one surface to the other. Further, in a case where the porous layer in accordance with an embodiment of the present invention is used as a constituent member of a nonaqueous electrolyte secondary battery laminated separator, the porous layer can be a layer capable of adhering to an electrode as the outermost layer of the separator.

Examples of the PVDF-based resin include homopolymers of vinylidene fluoride, copolymers of vinylidene fluoride and other monomer(s) copolymerizable with vinylidene fluoride, and mixtures of the above polymers. Examples of the monomer copolymerizable with vinylidene fluoride include hexafluoropropylene, tetrafluoroethylene, trifluoroethylene, trichloroethylene, and vinyl fluoride. The present invention can use (i) one kind of monomer or (ii) two or more kinds of monomers selected from above. The PVDF-based resin can be synthesized through emulsion polymerization or suspension polymerization.

The PVDF-based resin contains vinylidene fluoride at a proportion of normally not less than 85 mol %, preferably not less than 90 mol %, more preferably not less than 95 mol %, further preferably not less than 98 mol %. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer.

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous film layer) included in a nonaqueous electrolyte secondary battery separator than a porous layer not containing one of the two kinds of PVDF-based resins, with the result of a higher peel strength between the two layers. The first resin and the second resin preferably have a mass ratio of 15:85 to 85:15.

The PVDF-based resin has a weight-average molecular weight of preferably 200,000 to 3,000,000, more preferably 200,000 to 2,000,000, even more preferably 500,000 to 1,500,000. A PVDF-based resin having a weight-average molecular weight of not less than 200,000 tends to allow a porous layer and an electrode to adhere to each other sufficiently. A PVDF-based resin having a weight-average molecular weight of not more than 3,000,000 tends to allow for excellent shaping easiness.

The porous layer in accordance with an embodiment of the present invention may contain a resin other than the PVDF-based resin. Examples of the other resin include a styrene-butadiene copolymer; homopolymers or copolymers of vinyl nitriles such as acrylonitrile and methacrylonitrile; and polyethers such as polyethylene oxide and polypropylene oxide.

(Filler)

The porous layer in accordance with an embodiment of the present invention may contain a filler. The filler may be an inorganic or organic filler. The filler is contained at a proportion of preferably not less than 1% by mass and not more than 99% by mass, more preferably not less than 10% by mass and not more than 98% by mass, relative to the combined amount of the PVDF-based resin and the filler. The proportion of the filler may have a lower limit of not less than 50% by mass, not less than 70% by mass, or not less than 90% by mass. The filler such as the organic or inorganic filler may be a conventionally publicly known filler.

The porous layer in accordance with an embodiment of the present invention has an average thickness of preferably 0.5 μm to 10 μm, more preferably 1 μm to 5 μm, per layer in order to ensure adhesion to an electrode and a high energy density.

A porous layer having a film thickness of not less than 0.5 μm per layer is preferable because such a porous layer can (i) reduce the possibility of internal short circuiting resulting from, for example, a breakage of the nonaqueous electrolyte secondary battery and (ii) retain a sufficient amount of electrolyte.

If the porous layer has a thickness of more than 10 μm per layer, the nonaqueous electrolyte secondary battery will have an increased resistance to permeation of lithium ions. Thus, repeating charge-and-discharge cycles will degrade the positive electrode of the nonaqueous electrolyte secondary battery, with the result of a degraded rate characteristic and a degraded cycle characteristic. Further, such a porous layer will increase the distance between the positive electrode and the negative electrode, with the result of a decrease in the internal capacity efficiency of the nonaqueous electrolyte secondary battery.

The porous layer in accordance with the present embodiment is preferably disposed between the nonaqueous electrolyte secondary battery separator and the positive electrode active material layer of the positive electrode plate. The descriptions below of the physical properties of the porous layer are at least descriptions of the physical properties of a porous layer disposed between the nonaqueous electrolyte secondary battery separator and the positive electrode active material layer of the positive electrode plate in a nonaqueous electrolyte secondary battery.

The porous layer only needs to have a weight per unit area which weight is appropriately determined in view of the strength, film thickness, weight, and handleability of the nonaqueous electrolyte secondary battery laminated separator. Normally, the weight per unit area of the porous layer per layer is preferably 0.5 g/m$^2$ to 20 g/m$^2$, and more preferably 0.5 g/m$^2$ to 10 g/m$^2$.

A porous layer having a weight per unit area which weight falls within the above numerical range allows a nonaqueous electrolyte secondary battery including the porous layer to have a higher weight energy density and a higher volume energy density. If the weight per unit area of the porous layer is beyond the above range, the nonaqueous electrolyte secondary battery will be heavy.

The porous layer has a porosity of preferably 20% by volume to 90% by volume, more preferably 30% by volume to 80% by volume, in order to achieve sufficient ion permeability. The pore diameter of the pores in the porous layer is preferably not more than 1.0 μm, more preferably not more than 0.5 μm. In a case where the pores each have such a pore diameter, a nonaqueous electrolyte secondary battery that includes the porous layer can achieve sufficient ion permeability.

The nonaqueous electrolyte secondary battery laminated separator has an air permeability of preferably 30 sec/100 mL to 1000 sec/100 mL, more preferably 50 sec/100 mL to 800 sec/100 mL, in terms of Gurley values. The nonaqueous electrolyte secondary battery laminated separator, which has the above air permeability, allows the nonaqueous electrolyte secondary battery to have sufficient ion permeability.

An air permeability smaller than the above range means that the nonaqueous electrolyte secondary battery laminated separator has a high porosity and thus has a coarse laminated structure. This may result in a nonaqueous electrolyte secondary battery laminated separator having a lower strength and thus having an insufficient shape stability at high temperatures in particular. An air permeability larger than the above range may, on the other hand, prevent the nonaqueous electrolyte secondary battery laminated separator from having sufficient ion permeability and thus degrade the battery characteristics of the nonaqueous electrolyte secondary battery.

(Crystal Forms of PVDF-Based Resin)

The PVDF-based resin included in the porous layer in accordance with an embodiment of the present invention contains a PVDF-based resin having crystal form α (hereinafter, referred to as an α-form polyvinylidene fluoride-based resin) and a polyvinylidene fluoride-based resin having crystal form β (hereinafter, referred to as a β-form polyvinylidene fluoride-based resin). Assuming that the sum of the respective amounts of the α-form polyvinylidene fluoride-based resin and the β-form polyvinylidene fluoride-based resin contained in the PVDF-based resin is 100 mol %, the amount of the α-form polyvinylidene fluoride-based resin contained in the PVDF-based resin is not less than 35.0 mol %, preferably not less than 37.0 mol %, more preferably not less than 40.0 mol %, even more preferably not less than 44.0 mol %. Further, the amount of the α-form polyvinylidene fluoride-based resin is preferably not more than 90.0 mol %. The porous layer containing the α-form polyvinylidene fluoride-based resin in an amount falling within the above range is suitably usable as a member of a nonaqueous electrolyte secondary battery in which a decrease in discharge capacity after a charge-discharge cycle is reduced, in particular as a member of a nonaqueous electrolyte secondary battery laminated separator or as a member of an electrode of a nonaqueous electrolyte secondary battery.

The nonaqueous electrolyte secondary battery generates heat due to resistance inside the battery during charge and discharge, and calorific power increases as an electric current becomes higher, in other words, calorific power increases as a rate of charging or discharging becomes higher. In the PVDF-based resin, a melting point of the α-form polyvinylidene fluoride-based resin is higher than that of the β-form polyvinylidene fluoride-based resin, and thus the α-form polyvinylidene fluoride-based resin is less likely to cause plastic deformation by heat.

According to the porous layer in accordance with an embodiment of the present invention, a proportion of the α-form polyvinylidene fluoride-based resin contained in the PVDF-based resin constituting the porous layer is controlled to a specific proportion or more, and this makes it possible to inhibit deformation of an internal structure of the porous layer, blockage of voids, and the like which are caused due to deformation of the PVDF-based resin that is caused by heat generated during charge and discharge operations. Consequently, it is possible to reduce a decrease in discharge capacity after a charge-discharge cycle.

The PVDF-based resin having the α-form polyvinylidene fluoride-based resin is arranged such that the polymer of the PVDF-based resin contains a PVDF skeleton having molecular chains including a main-chain carbon atom bonded to a fluorine atom (or a hydrogen atom) adjacent to two carbon atoms one of which is bonded to a hydrogen atom (or a fluorine atom) having a trans position and the other (opposite) one of which is bonded to a hydrogen atom (or a fluorine atom) having a gauche position (positioned at an angle of 60°), wherein two or more such conformations are chained consecutively as follows:

(TGT$\overline{\text{G}}$ structure) [Math. 1]

and the molecular chains each have the following type:

TGT$\overline{\text{G}}$ [Math. 2]

wherein the respective dipole moments of $C$—$F_2$ and $C$—$H_2$ bonds each have a component perpendicular to the molecular chain and a component parallel to the molecular chain.

A PVDF-based resin having an α-form polyvinylidene fluoride-based resin has characteristic peaks at around −95 ppm and at around −78 ppm in a $^{19}F$-NMR spectrum.

The PVDF-based resin having a β-form polyvinylidene fluoride-based resin is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180° to the direction of the carbon-carbon bond.

The PVDF-based resin having the β-form polyvinylidene fluoride-based resin may be arranged such that the polymer of the PVDF-based resin contains a PVDF skeleton that has a TT-type conformation in its entirety. The PVDF-based resin having the β-form polyvinylidene fluoride-based resin may alternatively be arranged such that a portion of the PVDF skeleton has a TT-type conformation and that the PVDF-based resin having the β-form polyvinylidene fluoride-based resin has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of $C$—$F_2$ and $C$—$H_2$ bonds each have a component perpendicular to the molecular chain.

A PVDF-based resin having a β-form polyvinylidene fluoride-based resin has characteristic peaks at around −95 ppm in a $^{19}F$-NMR spectrum.

(Method for Calculating Content Rates of α-Form Polyvinylidene Fluoride-Based Resin and β-Form Polyvinylidene Fluoride-Based Resin in PVDF-Based Resin)

The rate of content of the α-form polyvinylidene fluoride-based resin and the rate of content of the β-form polyvinylidene fluoride-based resin in the porous layer in accordance with an embodiment of the present invention relative to 100 mol % of the combined content of the α-form polyvinylidene fluoride-based resin and the β-form polyvinylidene fluoride-based resin may be calculated from a $^{19}F$-NMR spectrum obtained from the porous layer. The content rates are specifically calculated as follows, for example:

(1) A $^{19}F$-NMR spectrum is obtained from a porous layer containing a PVDF-based resin, under the following conditions.

Measurement Conditions

Measurement device: AVANCE400 manufactured by Bruker Biospin

Measurement method: single-pulse method

Observed nucleus: $^{19}F$

Spectral bandwidth: 100 kHz

Pulse width: 3.0 s (90° pulse)

Pulse repetition time: 5.0 s

Reference material: $C_6F_6$ (external reference: −163.0 ppm)

Temperature: 22° C.

Sample rotation frequency: 25 kHz (2) An integral value of a peak at around −78 ppm in the $^{19}F$-NMR spectrum obtained in (1) is calculated and is regarded as an α/2 amount.

(3) As with the case of (2), an integral value of a peak at around −95 ppm in the $^{19}F$-NMR spectrum obtained in (1) is calculated and is regarded as an {(α/2)+β} amount.

(4) Assuming that the sum of (i) the content of the α-form polyvinylidene fluoride-based resin and (ii) the content of the β-form polyvinylidene fluoride-based resin is 100 mol %, the rate of content of the α-form polyvinylidene fluoride-based resin (hereinafter referred to also as "α rate") is calculated from the integral values of (2) and (3) in accordance with the following Formula (2):

α rate(mol %)=[(integral value at around −78 ppm)× 2/{(integral value at around −95 ppm)+(integral value at around −78 ppm)}]×100     (2)

(5) Assuming that the sum of (i) the content of the α-form polyvinylidene fluoride-based resin and (ii) the content of the β-form polyvinylidene fluoride-based resin is 100 mol %, the rate of content of the β-form polyvinylidene fluoride-based resin (hereinafter referred to also as "β rate") is calculated from the value of the α rate of (4) in accordance with the following Formula (3):

β rate (mol %)=100(mol %)−α rate(mol %)     (3)

(Method for Producing Porous Layer and Nonaqueous Electrolyte Secondary Battery Laminated Separator)

A method for producing each of the porous layer and the nonaqueous electrolyte secondary battery laminated separator in accordance with an embodiment of the present invention is not limited in particular, and any of various production methods may be employed.

According to the nonaqueous electrolyte secondary battery laminated separator, for example, a porous layer containing a PVDF-based resin and optionally a filler is formed through one of the processes (1) to (3) below on a surface of a porous film that serves as a base material. In the case of the process (2) or (3), a porous layer deposited is dried for removal of the solvent. In the case of production of a porous layer containing a filler, the coating solution in the processes (1) through (3) preferably contains a filler dispersed therein and a PVDF-based resin dissolved therein.

The coating solution for use in a method for producing a porous layer in accordance with an embodiment of the present invention can be prepared typically by (i) dissolving, in a solvent, a resin to be contained in the porous layer and, (ii) in a case where a filler is to be contained in the porous layer, dispersing the filler in the solvent.

(1) A process of (i) coating a surface of a porous film with a coating solution containing a PVDF-based resin to be contained in the porous layer and optionally a filler and (ii) drying the surface of the porous film to remove the solvent (dispersion medium) from the coating solution for formation of a porous layer.

(2) A process of (i) coating a surface of a porous film with the coating solution described in (1) and then (ii) immersing the porous film into a deposition solvent (which is a poor solvent for the PVDF-based resin) for deposition of a porous layer.

(3) A process of (i) coating a surface of a porous film with the coating solution described in (1) and then (ii) making the coating solution acidic with use of a low-boiling-point organic acid for deposition of a porous layer.

Examples of the solvent (dispersion medium) in the coating solution include N-methylpyrrolidone, N,N-dimethylacetamide, N,N-dimethylformamide, acetone, and water.

The deposition solvent is preferably isopropyl alcohol or t-butyl alcohol, for example.

For the process (3), the low-boiling-point organic acid can be, for example, paratoluene sulfonic acid or acetic acid.

The base material can be, other than a porous film, another film, a positive electrode plate, a negative electrode plate, or the like.

The coating solution may contain an additive(s) as appropriate such as a dispersing agent, a plasticizing agent, a surface active agent, and a pH adjusting agent as a component(s) other than the resin and the filler.

The coating solution can be applied to the porous film by a conventionally publicly known method. Specific examples of such a method include a gravure coater method, a dip coater method, a bar coater method, and a die coater method.

(Method for Controlling Crystal Forms of PVDF-Based Resin)

The crystal form of the PVDF-based resin contained in the porous layer in accordance with an embodiment of the present invention can be controlled on the basis of (i) drying conditions such as the drying temperature, and the air velocity and air direction during drying in the above described method and (ii) the deposition temperature at which a porous layer containing a PVDF-based resin is deposited with use of a deposition solvent or a low-boiling-point organic acid.

The drying conditions and the deposition temperature, which are adjusted so that the PVDF-based resin contains the α-form polyvinylidene fluoride-based resin in an amount of not less than 35.0 mol % with respect to 100 mol % of the total amount of the α-form polyvinylidene fluoride-based resin and the β-form polyvinylidene fluoride-based resin contained, may be changed as appropriate by changing, for example, the method for producing a porous layer, the kind of solvent (dispersion medium) to be used, the kind of deposition solvent to be used, and/or the kind of low-boiling-point organic acid to be used.

In a case where the coating solution is simply dried as in the process (1), the drying conditions may be changed as appropriate by adjusting, for example, the type of the solvent in the coating solution, the concentration of the PVDF-based resin in the coating solution, the amount of the filler (if contained), and/or the amount of the coating solution to be applied. In a case where a porous layer is to be formed through the above process (1), it is preferable that the drying temperature be 30° C. to 100° C., that the direction of hot air for drying be perpendicular to a nonaqueous electrolyte secondary battery separator or electrode plate to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a nonaqueous electrolyte secondary battery separator or an electrode plate to which the coating solution has been applied, and that the velocity of the hot air is 0.4 m/s to 40 m/s.

In a case where a porous layer is to be formed through the above process (2), it is preferable that the deposition temperature be −25° C. to 60° C. and that the drying temperature be 20° C. to 100° C. Specifically, in a case where a porous layer is to be formed through the above process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

(Another Porous Layer)

The nonaqueous electrolyte secondary battery in accordance with an embodiment of the present invention can contain another porous layer in addition to (i) the porous film and (ii) the porous layer containing the PVDF-based resin. The another porous layer need only be provided between (i) the nonaqueous electrolyte secondary battery separator and (ii) at least one of the positive electrode plate and the negative electrode plate. The porous layer and the another porous layer may be provided in any order with respect to the nonaqueous electrolyte secondary battery separator. In a preferable configuration, the porous film, the another porous layer, and the porous layer containing the PVDF-based resin are disposed in this order. In other words, the another porous layer is provided between the porous film and the porous layer containing the PVDF-based resin. In another preferable configuration, the another porous layer and the porous layer containing the PVDF-based resin are provided in this order on both surfaces of the porous film.

Examples of a resin which can be contained in the another porous layer in accordance with an embodiment of the present invention encompass: polyolefins; (meth)acrylate-based resins; fluorine-containing resins (excluding polyvinylidene fluoride-based resins); polyamide-based resins; polyimide-based resins; polyester-based resins; rubbers; resins with a melting point or glass transition temperature of not lower than 180° C.; water-soluble polymers; polycarbonate, polyacetal, and polyether ether ketone.

Among the above resins, polyolefins, (meth)acrylate-based resins, polyamide-based resins, polyester-based resins and water-soluble polymers are preferable.

The polyolefins are preferably polyethylene, polypropylene, polybutene, an ethylene-propylene copolymer, and the like.

Examples of the fluorine-containing resins encompass polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer. Particular examples of the fluorine-containing resins encompass fluorine-containing rubber having a glass transition temperature of not higher than 23° C.

As the polyamide resins, aramid resins such as aromatic polyamide and wholly aromatic polyamide are preferable.

Specific examples of the aramid resins include poly(paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly(metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among those aramid resins, poly(paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Only one kind of these resins to be contained in the another porous layer can be used, or two or more kinds of these resins can be used in combination.

The other characteristics (e.g., thickness) of the another porous layer are similar to those described above in [4. Porous layer], except that the porous layer contains the PVDF-based resin.

[5. Nonaqueous Electrolyte]

A nonaqueous electrolyte that can be contained in the nonaqueous electrolyte secondary battery in accordance with an embodiment of the present invention is not limited to any particular one, provided that the nonaqueous electrolyte is one that is generally used for a nonaqueous electrolyte secondary battery. The nonaqueous electrolyte can be a nonaqueous electrolyte containing, for example, an organic solvent and a lithium salt dissolved therein. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Examples of the organic solvent to be contained in the nonaqueous electrolyte encompass carbonates, ethers, esters, nitriles, amides, carbamates, and sulfur-containing compounds, and fluorine-containing organic solvents each obtained by introducing a fluorine group into any of these organic solvents. It is possible to use only one kind of the above organic solvents or two or more kinds of the above organic solvents in combination.

[6. Nonaqueous Electrolyte Secondary Battery]

The nonaqueous electrolyte secondary battery in accordance with an embodiment of the present invention includes, as described above, (i) a nonaqueous electrolyte secondary battery separator including a polyolefin porous film, (ii) a porous layer, (iii) a positive electrode plate, and (iv) a negative electrode plate. The nonaqueous electrolyte secondary battery in accordance with an embodiment of the present invention meets the requirements (i) to (iv) below.

(i) The polyvinylidene fluoride-based resin contained in the porous layer contains an α-form polyvinylidene fluoride-based resin in an amount of not less than 35.0 mol % with respect to 100 mol % of the combined amount of the α-form polyvinylidene fluoride-based resin and a β-form polyvinylidene fluoride-based resin contained in the polyvinylidene fluoride-based resin.

(ii) The positive electrode plate has a value represented by |1−T/M| which value is not less than 0.00 and not more than 0.50.

(iii) The negative electrode plate has a value represented by |1−T/M| which value is not less than 0.00 and not more than 0.50.

(iv) The polyolefin porous film has a temperature rise ending period of 2.9 seconds·m$^2$/g to 5.7 seconds·m$^2$/g with respect to an amount of resin per unit area in a case where the polyolefin porous film has been impregnated with N-methylpyrrolidone containing 3% by weight of water and has then been irradiated with a microwave having a frequency of 2455 MHz and an output of 1800 W.

In a case where the requirement (i) is met, in the nonaqueous electrolyte secondary battery in accordance with an embodiment of the present invention, plastic deformation of the PVDF-based resin at a high temperature is inhibited, and structural deformation of the porous layer and blockage of voids after charge and discharge are prevented. In a case where the requirements (ii) and (iii) are met, the entire electrode is more likely to isotropically follow expansion and shrinkage of the active material. Therefore, adhesiveness between the components inside the electrode active material layer is easily maintained, and adhesiveness between the electrode active material layer and a current collector is easily maintained. Further, in a case where the requirement (iv) is met, the capability to supply the electrolyte from the polyolefin porous film to the electrode, the capillary force in the pores, and the area of the wall of the pores can be controlled to specific ranges, and this makes it possible to prevent the electrolyte from being dried up and to prevent the pores from being blocked.

According to the nonaqueous electrolyte secondary battery which meets the requirements (i) through (iv), (a) the polyolefin porous film and the porous layer after a charge-discharge cycle have good structural stabilities, and accordingly the polyolefin porous film and the porous layer have good ion permeabilities, (b) the nonaqueous electrolyte is adequately supplied from the polyolefin porous film to the electrode, and (c) the above described adhesivenesses are easily maintained, and therefore deterioration in the nonaqueous electrolyte secondary battery during the charge-discharge cycle is inhibited. From those, even after the cycle, a decrease in discharge capacity of the battery may be reduced.

[7. Method for Producing Nonaqueous Electrolyte Secondary Battery]

The nonaqueous electrolyte secondary battery in accordance with an embodiment of the present invention can be produced by, for example, (i) forming a nonaqueous electrolyte secondary battery member in which the positive electrode plate, the nonaqueous electrolyte secondary battery laminated separator, and the negative electrode plate are arranged in this order, (ii) then inserting the nonaqueous electrolyte secondary battery member into a container for use as a housing of the nonaqueous electrolyte secondary battery, (iii) then filling the container with a nonaqueous electrolyte, and (iv) then hermetically sealing the container under reduced pressure.

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The following description will discuss embodiments of the present invention in further detail with reference to Examples and Comparative Examples. Note, however, that the present invention is not limited to those Examples.

[Method for Measuring Various Physical Properties]

In the Examples and Comparative Examples, measurements were carried out by the following methods:

(1) Film Thickness

The film thickness of a porous film was measured with use of a high-accuracy digital length measuring machine (VL-50) manufactured by Mitutoyo Corporation.

(2) Temperature Rise Ending Period at Microwave Irradiation (Porous Film)

An 8 cm×8 cm test piece was cut out from a porous film obtained in each of Examples and Comparative Examples below, and a weight W (g) of the test piece was measured.

Then, a weight per unit area of the test piece was calculated in accordance with the following formula: Weight per unit area $(g/m^2)=W/(0.08\times0.08)$.

Next, the test piece was impregnated with N-methylpyrrolidone (NMP) to which 3% by weight of water had been added. Then, the test piece was placed on a Teflon (registered trademark) sheet (12 cm×10 cm). The test piece was folded in half in such a manner as to sandwich an optical fiber thermometer (manufactured by ASTEC Co., Ltd., Neoptix Reflex thermometer) coated with polytetrafluoroethylene (PTFE).

Next, the test piece, which had been impregnated with NMP containing water and had been so folded as to sandwich the thermometer, was fixed in a microwave irradiation device (manufactured by Micro Denshi Co., Ltd., 9-kW microwave oven; frequency: 2455 MHz) equipped with a turntable. The test piece was then irradiated with a microwave at 1800 W for 2 minutes. Note that a surface temperature of the film immediately before microwave irradiation was adjusted to 29±1° C.

An air temperature inside the device at the microwave irradiation was 27° C. to 30° C.

The optical fiber thermometer was used to measure, every 0.2 seconds, changes in the temperature of the test piece after the start of the microwave irradiation. In the temperature measurements, the temperature at which no temperature rise was measured for not less than 1 second was used as a temperature rise ending temperature, and the time period that elapsed before the temperature rise ending temperature was reached after the start of the microwave irradiation was used as a temperature rise ending period. The temperature rise ending period was divided by the above weight per unit area for calculation of a temperature rise ending period (i.e., a temperature rise ending period per weight per unit area) with respect to the amount of resin per unit area.

(3) Rate of Content of α-Form Polyvinylidene Fluoride-Based Resin (Porous Layer)

A piece with a size of approximately 2 cm×5 cm was cut out from each of the laminated separators produced in the Examples and Comparative Examples below. Then, the rate of content (α rate) of the α-form polyvinylidene fluoride-based resin in the PVDF-based resin was measured through the above steps (1) through (4) described in (Method for calculating content rates of α-form polyvinylidene fluoride-based resin and β-form polyvinylidene fluoride-based resin in PVDF-based resin).

(4) Respective Average Particle Sizes of Positive Electrode Active Material and Negative Electrode Active Material The volume-based particle size distribution and average particle size (D50) were measured with use of a laser diffraction particle size analyzer (product name: SALD2200, manufactured by Shimadzu Corporation).

(5) Porosity (Electrode Active Material Layer)

In accordance with the formula described in (Interpretation of results of scratch test and control method), porosity ε of the positive electrode active material layer or the negative electrode active material layer was calculated.

(6) Scratch Test (Positive Electrode Plate and Negative Electrode Plate)

A piece with a size of 20 mm×60 mm was cut out from each of the positive electrode plates and the negative electrode plates produced in the Examples and Comparative Examples below. Then, the piece was subjected to the scratch test through the steps (1) through (4) described in the above (Scratch test).

(7) Decreasing Rate of Discharge Capacity at 1 C After Charge-Discharge Cycle (Nonaqueous Electrolyte Secondary Battery)

A decreasing rate of the discharge capacity at 1 C after a charge-discharge cycle was calculated through the steps (1) through (3) described in [1. Nonaqueous electrolyte secondary battery in accordance with an aspect of the present invention].

Example 1

[Production of Nonaqueous Electrolyte Secondary Battery Laminated Separator]

The following substances (i) through (iii) in the form of powder were mixed with a Henschel mixer, and the resulting mixture was then melted and kneaded in a twin screw kneading extruder. This produced a polyolefin resin composition.

(i) 70% by weight of ultra-high molecular weight polyethylene powder (GUR4032, manufactured by Ticona Corporation) having a weight-average molecular weight of 4,970,000, and 30% by weight of polyethylene wax (FNP-0115, manufactured by Nippon Seiro Co., Ltd.) having a weight-average molecular weight of 1,000;

(ii) 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate (note that a total weight of (i) is defined as 100 parts by weight);

(iii) 36% by volume of calcium carbonate (manufactured by Maruo Calcium Co., Ltd.) having an average particle size of 0.1 μm (note that a total volume of (i) through (iii) is defined as 100% by volume).

Then, the polyolefin resin composition was rolled into a sheet with use of a pair of rollers each having a surface temperature of 150° C. This sheet was immersed in an aqueous hydrochloric acid solution (containing 4 mol/L of hydrochloric acid and 0.5% by weight of nonionic surfactant) for removal of the calcium carbonate. The sheet was then stretched 6.2-fold at 100° C. to 105° C. at a straining rate of 750% per minute. This prepared a film having a thickness of 16.3 μm. This film was then subjected to heat fixation at 115° C. This produced a porous film 1.

An N-methyl-2-pyrrolidone (hereinafter referred to also as "NMP") solution (manufactured by Kureha Corporation; product name: L #9305, weight-average molecular weight: 1,000,000) containing a PVDF-based resin (polyvinylidene fluoride-hexafluoropropylene copolymer) was prepared as a coating solution. The coating solution was applied to the porous film 1. The application of the coating solution was carried out by a doctor blade method so that an amount of the PVDF-based resin in the coating solution is adjusted to be 6.0 g per square meter.

The porous film, to which the coating solution had been applied, was immersed into 2-propanol while the coating film was wet with the solvent, and was then left to stand still at 25° C. for 5 minutes. This produced a laminated porous film 1. The laminated porous film 1 produced was further immersed into other 2-propanol while the laminated porous film 1 was wet with the above immersion solvent, and was then left to stand still at 25° C. for 5 minutes. This produced a laminated porous film 1a. The laminated porous film 1a thus obtained was dried at 65° C. for 5 minutes, so that a nonaqueous electrolyte secondary battery laminated separator 1 was obtained. Table 1 shows results of evaluation of the porous film 1 and the nonaqueous electrolyte secondary battery laminated separator 1 which were obtained as above.

[Preparation of Nonaqueous Electrolyte Secondary Battery]

(Positive Electrode Plate)

A positive electrode plate was obtained in which a positive electrode mix ($LiNi_{0.5}Mn_{0.3}Co_{0.2}O_2$/electrically conductive agent/PVDF (weight ratio of 92:5:3)) was disposed on one surface of a positive electrode current collector (aluminum foil). A volume-based average particle size (D50) of $LiNi_{0.5}Mn_{0.3}Co_{0.2}O_2$ was 4.5 μm. A porosity of the positive electrode active material layer in the obtained positive electrode plate was 40%.

The positive electrode plate was partially cut off as a positive electrode plate 1 that was constituted by (i) a portion which had a size of 45 mm×30 mm and on which a positive electrode active material layer was disposed and (ii) a portion which surrounded an outer periphery of the portion of (i) and had a width of 13 mm and on which the positive electrode active material layer was not disposed. Table 1 shows a result of the scratch test carried out with respect to the positive electrode plate 1.

(Negative Electrode Plate)

A negative electrode plate was obtained in which a negative electrode mix (natural graphite/styrene-1,3-butadiene copolymer/sodium carboxymethylcellulose (weight ratio of 98:1:1)) was disposed on one surface of a negative electrode current collector (copper foil). A volume-based average particle size (D50) of natural graphite was 15 μm. A porosity of the negative electrode active material layer in the obtained negative electrode plate was 31%.

The negative electrode plate was partially cut off as a negative electrode plate 1 that was constituted by (i) a portion which had a size of 50 mm×35 mm and on which a negative electrode active material layer was disposed and (ii) a portion which surrounded an outer periphery of the portion of (i) and had a width of 13 mm and on which the negative electrode active material layer was not disposed. Table 1 shows a result of the scratch test carried out with respect to the negative electrode plate 1.

(Assembly of Nonaqueous Electrolyte Secondary Battery)

The following method was used for preparing a nonaqueous electrolyte secondary battery by using the positive electrode plate 1, the negative electrode plate 1, and the nonaqueous electrolyte secondary battery laminated separator 1.

In a laminate pouch, the positive electrode plate 1, the nonaqueous electrolyte secondary battery laminated separator 1, and the negative electrode plate 1 were stacked (disposed) in this order so as to obtain a nonaqueous electrolyte secondary battery member 1. During this operation, the positive electrode plate 1 and the negative electrode plate 1 were arranged so that the positive electrode active material layer of the positive electrode plate 1 had a main surface that was entirely covered by the main surface of the negative electrode active material layer of the negative electrode plate 1.

Subsequently, the nonaqueous electrolyte secondary battery member 1 was put into a bag prepared in advance and made of a laminate of an aluminum layer and a heat seal layer. Further, 0.23 mL of nonaqueous electrolyte was put into the bag. The above nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while the pressure inside the bag was reduced. This produced a nonaqueous electrolyte secondary battery 1.

After that, a decrease in discharge capacity at 1 C after a charge-discharge cycle of the nonaqueous electrolyte secondary battery 1 obtained by the above described method was measured. A result of the measurement is shown in Table 1.

Example 2

[Production of Nonaqueous Electrolyte Secondary Battery Laminated Separator]

The following substances (i) through (iii) in the form of powder were mixed with a Henschel mixer, and the resulting mixture was then melted and kneaded in a twin screw kneading extruder. This produced a polyolefin resin composition.

(i) 70% by weight of ultra-high molecular weight polyethylene powder (GUR4032, manufactured by Ticona Corporation) having a weight-average molecular weight of 4,970,000, and 30% by weight of polyethylene wax (FNP-0115, manufactured by Nippon Seiro Co., Ltd.) having a weight-average molecular weight of 1,000;

(ii) 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate (note that a total weight of (i) is defined as 100 parts by weight);

(iii) 36% by volume of calcium carbonate (manufactured by Maruo Calcium Co., Ltd.) having an average particle size of 0.1 μm (note that a total volume of (i) through (iii) is defined as 100% by volume).

Then, the polyolefin resin composition was rolled into a sheet with use of a pair of rollers each having a surface temperature of 150° C. This sheet was immersed in an aqueous hydrochloric acid solution (containing 4 mol/L of hydrochloric acid and 0.5% by weight of nonionic surfactant) for removal of the calcium carbonate. The sheet was then stretched 6.2-fold at 100° C. to 105° C. at a straining rate of 1250% per minute. This prepared a film having a thickness of 15.5 μm. This film was then subjected to heat fixation treatment at 120° C. This produced a porous film 2.

A coating solution was applied to the porous film 2 in a manner similar to that of Example 1. The porous film, to which the coating solution had been applied, was immersed into 2-propanol while the coating film was wet with the solvent, and was then left to stand still at −10° C. for 5 minutes. This produced a laminated porous film 2. The laminated porous film 2 produced was further immersed into other 2-propanol while the laminated porous film 2 was wet with the above immersion solvent, and was then left to stand still at 25° C. for 5 minutes. This produced a laminated porous film 2a. The laminated porous film 2a thus obtained was dried at 30° C. for 5 minutes, so that a nonaqueous electrolyte secondary battery laminated separator 2 was obtained. Table 1 shows results of evaluation of the porous film 2 and the nonaqueous electrolyte secondary battery laminated separator 2 which were obtained as above.

[Preparation of Nonaqueous Electrolyte Secondary Battery]

A nonaqueous electrolyte secondary battery was prepared in a manner similar to that of Example 1, except that the nonaqueous electrolyte secondary battery laminated separator 2 was used instead of the nonaqueous electrolyte secondary battery laminated separator 1. The nonaqueous electrolyte secondary battery thus prepared is hereinafter referred to as "nonaqueous electrolyte secondary battery 2".

After that, a decrease in discharge capacity at 1 C after a charge-discharge cycle of the nonaqueous electrolyte secondary battery 2 obtained by the above described method was measured. A result of the measurement is shown in Table 1.

Example 3

[Production of Nonaqueous Electrolyte Secondary Battery Laminated Separator]

The following substances (i) through (iii) in the form of powder were mixed with a Henschel mixer, and the resulting mixture was then melted and kneaded in a twin screw kneading extruder. This produced a polyolefin resin composition.

(i) 71% by weight of ultra-high molecular weight polyethylene powder (GUR4032, manufactured by Ticona Corporation) having a weight-average molecular weight of 4,970,000, and 29% by weight of polyethylene wax (FNP-0115, manufactured by Nippon Seiro Co., Ltd.) having a weight-average molecular weight of 1,000;

(ii) 0.4 parts by weight of an antioxidant (Irg1010, manufactured by Ciba Specialty Chemicals Corporation), 0.1 parts by weight of an antioxidant (P168, manufactured by Ciba Specialty Chemicals Corporation), and 1.3 parts by weight of sodium stearate (note that a total weight of (i) is defined as 100 parts by weight);

(iii) 37% by volume of calcium carbonate (manufactured by Maruo Calcium Co., Ltd.) having an average particle size of 0.1 μm (note that a total volume of (i) through (iii) is defined as 100% by volume).

Then, the polyolefin resin composition was rolled into a sheet with use of a pair of rollers each having a surface temperature of 150° C. This sheet was immersed in an aqueous hydrochloric acid solution (containing 4 mol/L of hydrochloric acid and 0.5% by weight of nonionic surfactant) for removal of the calcium carbonate. The sheet was then stretched 7.0-fold at 100° C. to 105° C. at a straining rate of 2100% per minute. This prepared a film having a thickness of 11.7 μm. This film was then subjected to heat fixation treatment at 123° C. This produced a porous film 3.

A coating solution was applied to the porous film 3 in a manner similar to that of Example 1. The porous film, to which the coating solution had been applied, was immersed into 2-propanol while the coating film was wet with the solvent, and was then left to stand still at −5° C. for 5 minutes. This produced a laminated porous film 3. The laminated porous film 3 produced was further immersed into other 2-propanol while the laminated porous film 3 was wet with the above immersion solvent, and was then left to stand still at 25° C. for 5 minutes. This produced a laminated porous film 3a. The laminated porous film 3a thus obtained was dried at 30° C. for 5 minutes, so that a nonaqueous electrolyte secondary battery laminated separator 3 was obtained. Table 1 shows results of evaluation of the porous film 3 and the nonaqueous electrolyte secondary battery laminated separator 3 which were obtained as above.

[Preparation of Nonaqueous Electrolyte Secondary Battery]

A nonaqueous electrolyte secondary battery was prepared in a manner similar to that of Example 1, except that the nonaqueous electrolyte secondary battery laminated separator 3 was used instead of the nonaqueous electrolyte secondary battery laminated separator 1. The nonaqueous electrolyte secondary battery thus prepared is hereinafter referred to as "nonaqueous electrolyte secondary battery 3".

After that, a decrease in discharge capacity at 1 C after a charge-discharge cycle of the nonaqueous electrolyte secondary battery 3 obtained by the above described method was measured. A result of the measurement is shown in Table 1.

Example 4

(Positive Electrode Plate)

A positive electrode plate was obtained in which a positive electrode mix ($LiCoO_2$/electrically conductive agent/PVDF (weight ratio of 97:1.8:1.2)) was disposed on one surface of a positive electrode current collector (aluminum foil). A volume-based average particle size (D50) of $LiCoO_2$ was 5 μm. A porosity of the positive electrode active material layer in the obtained positive electrode plate was 20%.

The positive electrode plate was partially cut off as a positive electrode plate 2 that was constituted by (i) a portion which had a size of 45 mm×30 mm and on which a positive electrode active material layer was disposed and (ii) a portion which surrounded an outer periphery of the portion of (i) and had a width of 13 mm and on which the positive electrode active material layer was not disposed. Table 1 shows a result of the scratch test carried out with respect to the positive electrode plate 2.

[Preparation of Nonaqueous Electrolyte Secondary Battery]

The positive electrode plate 2 was used as a positive electrode plate, the negative electrode plate 1 was used as a negative electrode plate, and the nonaqueous electrolyte secondary battery laminated separator 3 was used as a nonaqueous electrolyte secondary battery laminated separator. Except for those, a nonaqueous electrolyte secondary battery was prepared in a manner similar to that of Example 1. The nonaqueous electrolyte secondary battery thus prepared is hereinafter referred to as "nonaqueous electrolyte secondary battery 4".

After that, a decrease in discharge capacity at 1 C after a charge-discharge cycle of the nonaqueous electrolyte secondary battery 4 obtained by the above described method was measured. A result of the measurement is shown in Table 1.

Example 5

(Positive Electrode Plate)

A positive electrode plate was obtained in which a positive electrode mix ($LiNi_{0.33}Mn_{0.33}Co_{0.33}O_2$/electrically conductive agent/PVDF (weight ratio of 100:5:3)) was disposed on one surface of a positive electrode current collector (aluminum foil). A volume-based average particle size (D50) of $LiNi_{0.33}Mn_{0.33}Co_{0.33}O_2$ was 10 μm. A porosity of the positive electrode active material layer in the obtained positive electrode plate was 34%.

The positive electrode plate was partially cut off as a positive electrode plate 3 that was constituted by (i) a portion which had a size of 45 mm×30 mm and on which a positive electrode active material layer was disposed and (ii) a portion which surrounded an outer periphery of the portion of (i) and had a width of 13 mm and on which the positive electrode active material layer was not disposed. Table 1 shows a result of the scratch test carried out with respect to the positive electrode plate 3.

[Preparation of Nonaqueous Electrolyte Secondary Battery]

The positive electrode plate 3 was used as a positive electrode plate, the negative electrode plate 1 was used as a negative electrode plate, and the nonaqueous electrolyte secondary battery laminated separator 3 was used as a nonaqueous electrolyte secondary battery laminated separator. Except for those, a nonaqueous electrolyte secondary battery was prepared in a manner similar to that of Example 1. The nonaqueous electrolyte secondary battery thus prepared is hereinafter referred to as "nonaqueous electrolyte secondary battery 5".

After that, a decrease in discharge capacity at 1 C after a charge-discharge cycle of the nonaqueous electrolyte secondary battery 5 obtained by the above described method was measured. A result of the measurement is shown in Table 1.

Example 6

(Negative Electrode Plate)

A negative electrode plate was obtained in which a negative electrode mix (artificial graphite/styrene-1,3-butadiene copolymer/sodium carboxymethylcellulose (weight ratio of 98:1:1)) was disposed on one surface of a negative electrode current collector (copper foil). A volume-based average particle size (D50) of artificial graphite was 22 μm. A porosity of the negative electrode active material layer in the obtained negative electrode plate was 35%.

The negative electrode plate was partially cut off as a negative electrode plate 2 that was constituted by (i) a portion which had a size of 50 mm×35 mm and on which a negative electrode active material layer was disposed and (ii) a portion which surrounded an outer periphery of the portion of (i) and had a width of 13 mm and on which the negative electrode active material layer was not disposed. Table 1 shows a result of the scratch test carried out with respect to the negative electrode plate 2.

[Preparation of Nonaqueous Electrolyte Secondary Battery]

The positive electrode plate 1 was used as a positive electrode plate, the negative electrode plate 2 was used as a negative electrode plate, and the nonaqueous electrolyte secondary battery laminated separator 3 was used as a nonaqueous electrolyte secondary battery laminated separator. Except for those, a nonaqueous electrolyte secondary battery was prepared in a manner similar to that of Example 1. The nonaqueous electrolyte secondary battery thus prepared is hereinafter referred to as "nonaqueous electrolyte secondary battery 6".

After that, a decrease in discharge capacity at 1 C after a charge-discharge cycle of the nonaqueous electrolyte secondary battery 6 obtained by the above described method was measured. A result of the measurement is shown in Table 1.

Example 7

[Preparation of Porous Layer and Nonaqueous Electrolyte Secondary Battery Laminated Separator]

A PVDF-based resin (manufactured by Arkema Inc.; product name "Kynar (registered trademark) LBG"; weight-average molecular weight of 590,000) was stirred in N-methyl-2-pyrrolidone at 65° C. for 30 minutes and thus dissolved such that a solid content becomes 10% by mass. The solution thus obtained was used as a binder solution. As a filler, alumina fine particles (manufactured by Sumitomo Chemical Co., Ltd.; product name "AKP3000"; containing 5 ppm of silicon) was used. The alumina fine particles, the binder solution, and a solvent (N-methyl-2-pyrrolidone) were mixed together in the following proportion. That is, the alumina fine particles, the binder solution, and the solvent were mixed together so that (i) a resultant mixed solution contained 10 parts by weight of the PVDF-based resin with respect to 90 parts by weight of the alumina fine particles and (ii) a solid content concentration (alumina fine particles+ PVDF-based resin) of the mixed solution was 10% by weight. A dispersion solution was thus obtained. The dispersion solution thus obtained was used as a coating solution.

The coating solution was applied to the porous film 3, which was prepared in Example 3, by a doctor blade method so that an amount of the PVDF-based resin in the coating solution becomes 6.0 g per square meter, and thus a laminated porous film 4 was obtained. The laminated porous film 4 was dried at 65° C. for 5 minutes, so that a nonaqueous electrolyte secondary battery laminated separator 4 was obtained. The drying was carried out by blowing hot air onto the porous film 3 in a direction perpendicular to the porous film 3 at a hot air velocity of 0.5 m/s. Table 1 shows a result of evaluation of the nonaqueous electrolyte secondary battery laminated separator 4 which was obtained as above.

[Preparation of Nonaqueous Electrolyte Secondary Battery]

A nonaqueous electrolyte secondary battery was prepared in a manner similar to that of Example 1, except that the nonaqueous electrolyte secondary battery laminated separator 4 was used as a nonaqueous electrolyte secondary battery laminated separator. The nonaqueous electrolyte secondary battery thus prepared is hereinafter referred to as "nonaqueous electrolyte secondary battery 7".

After that, a decrease in discharge capacity at 1 C after a charge-discharge cycle of the nonaqueous electrolyte secondary battery 7 obtained by the above described method was measured. A result of the measurement is shown in Table 1.

Comparative Example 1

[Preparation of Nonaqueous Electrolyte Secondary Battery Laminated Separator]

A porous film to which a coating solution had been applied as in Example 3 was immersed into 2-propanol while the coating film was wet with the solvent, and was then left to stand still at −78° C. for 5 minutes. This produced a laminated porous film 5. The laminated porous film 5 produced was further immersed into other 2-propanol while the laminated porous film 5 was wet with the above immersion solvent, and was then left to stand still at 25° C. for 5 minutes. This produced a laminated porous film 5a. The laminated porous film 5a thus obtained was dried at 30° C. for 5 minutes, so that a nonaqueous electrolyte secondary battery laminated separator 5 was obtained. Table 1 shows a result of evaluation of the nonaqueous electrolyte secondary battery laminated separator 5 which was obtained as above.

[Preparation of Nonaqueous Electrolyte Secondary Battery]

A nonaqueous electrolyte secondary battery was prepared in a manner similar to that of Example 1, except that the nonaqueous electrolyte secondary battery laminated separator 5 was used as a nonaqueous electrolyte secondary battery laminated separator. The nonaqueous electrolyte secondary battery thus prepared is hereinafter referred to as "nonaqueous electrolyte secondary battery 8".

After that, a decrease in discharge capacity at 1 C after a charge-discharge cycle of the nonaqueous electrolyte secondary battery 8 obtained by the above described method was measured. A result of the measurement is shown in Table 1.

Comparative Example 2

(Positive Electrode Plate)

A positive electrode plate was obtained in which a positive electrode mix ($LiMn_2O_4$/electrically conductive agent/PVDF (weight ratio of 100:5:3)) was disposed on one surface of a positive electrode current collector (aluminum foil). A volume-based average particle size (D50) of $LiMn_2O_4$ was 8 μm. A porosity of the positive electrode active material layer in the obtained positive electrode plate was 51%.

The positive electrode plate was partially cut off as a positive electrode plate 4 that was constituted by (i) a portion which had a size of 45 mm×30 mm and on which a positive electrode active material layer was disposed and (ii) a portion which surrounded an outer periphery of the portion of (i) and had a width of 13 mm and on which the positive electrode active material layer was not disposed. Table 1 shows a result of the scratch test carried out with respect to the positive electrode plate 4.

[Preparation of Nonaqueous Electrolyte Secondary Battery]

The positive electrode plate 4 was used as a positive electrode plate, the negative electrode plate 1 was used as a negative electrode plate, and the nonaqueous electrolyte secondary battery laminated separator 3 was used as a nonaqueous electrolyte secondary battery laminated separator. Except for those, a nonaqueous electrolyte secondary battery was prepared in a manner similar to that of Example 1. The nonaqueous electrolyte secondary battery thus prepared is hereinafter referred to as "nonaqueous electrolyte secondary battery 9".

After that, a decrease in discharge capacity at 1 C after a charge-discharge cycle of the nonaqueous electrolyte secondary battery 9 obtained by the above described method was measured. A result of the measurement is shown in Table 1.

Comparative Example 3

(Negative Electrode Plate)

A negative electrode plate was obtained in which a negative electrode mix (artificial spherocrystal graphite/electrically conductive agent/PVDF (weight ratio of 85:15:7.5)) was disposed on one surface of a negative electrode current collector (copper foil). A volume-based average particle size (D50) of artificial spherocrystal graphite was 34 μm. A porosity of the negative electrode active material layer in the obtained negative electrode plate was 59%.

The negative electrode plate was partially cut off as a negative electrode plate 3 that was constituted by (i) a portion which had a size of 50 mm×35 mm and on which a negative electrode active material layer was disposed and (ii) a portion which surrounded an outer periphery of the portion of (i) and had a width of 13 mm and on which the negative electrode active material layer was not disposed. Table 1 shows a result of the scratch test carried out with respect to the negative electrode plate 3.

[Preparation of Nonaqueous Electrolyte Secondary Battery]

The positive electrode plate 1 was used as a positive electrode plate, the negative electrode plate 3 was used as a negative electrode plate, and the nonaqueous electrolyte secondary battery laminated separator 3 was used as a nonaqueous electrolyte secondary battery laminated separator. Except for those, a nonaqueous electrolyte secondary battery was prepared in a manner similar to that of Example 1. The nonaqueous electrolyte secondary battery thus prepared is hereinafter referred to as "nonaqueous electrolyte secondary battery 10".

After that, a decrease in discharge capacity at 1 C after a charge-discharge cycle of the nonaqueous electrolyte secondary battery 10 obtained by the above described method was measured. A result of the measurement is shown in Table 1.

TABLE 1

| | Nonaqueous electrolyte secondary battery laminated separator | | Electrode plate | | Nonaqueous electrolyte Secondary battery Decreasing rate of discharge capacity at 1 C after |
| --- | --- | --- | --- | --- | --- |
| | Porous film Temperature rise ending period/weight per unit area (sec · m²/g) | Porous layer Amount of α-form polyvinylidene fluoride-based resin (mol %) | Positive electrode plate $\|1-T/M\|$ | Negative electrode plate $\|1-T/M\|$ | charge-discharge cycle (%) |
| Example 1 | 5.62 | 80.8 | 0.33 | 0.10 | 10.1 |
| Example 2 | 2.99 | 35.3 | 0.33 | 0.10 | 10.5 |
| Example 3 | 5.26 | 44.4 | 0.33 | 0.10 | 11.5 |
| Example 4 | 5.26 | 44.4 | 0.47 | 0.10 | 12.9 |
| Example 5 | 5.26 | 44.4 | 0.04 | 0.10 | 10.0 |
| Example 6 | 5.26 | 44.4 | 0.33 | 0.49 | 12.4 |
| Example 7 | 5.26 | 64.3 | 0.33 | 0.10 | 12.8 |
| Comparative Example 1 | 5.26 | 34.6 | 0.33 | 0.10 | 13.1 |
| Comparative Example 2 | 5.26 | 44.4 | 0.54 | 0.10 | 64.6 |
| Comparative Example 3 | 5.26 | 44.4 | 0.33 | 0.53 | 16.1 |

(Results)

In all the Examples 1 through 7, (i) the α rate of the polyvinylidene fluoride-based resin contained in the porous layer (coating layer) was not less than 35.0 mol % and (ii) the values of $|1-T/M|$ of the positive electrode plate and the negative electrode plate fell within the range from 0.00 to 0.50. Therefore, the decreasing rate of the discharge capacity at 1 C after a charge-discharge cycle was a preferable value, that is, not higher than 13.0%.

On the other hand, Comparative Examples failed to satisfy any of the conditions. Specifically, (i) in Comparative Example 1, the α rate of the polyvinylidene fluoride-based resin contained in the porous layer was less than 35.0 mol %, (ii) in Comparative Example 2, the value of $|1-T/M|$ of the positive electrode plate exceeded 0.50, and, (iii) in Comparative Example 3, the value of $|1-T/M|$ of the negative electrode plate exceeded 0.50. Consequently, in all the Comparative Examples, the decreasing rate of the discharge capacity at 1 C after a charge-discharge cycle exceeded 13.0%.

INDUSTRIAL APPLICABILITY

In the nonaqueous electrolyte secondary battery in accordance with an aspect of the present invention, a decrease in discharge capacity after a charge-discharge cycle is reduced. Therefore, the present invention is suitably applicable to (i) batteries for use in a personal computer, a mobile telephone, a portable information terminal, and the like and (ii) on-vehicle batteries.

The invention claimed is:

1. A nonaqueous electrolyte secondary battery, comprising:
    a nonaqueous electrolyte secondary battery separator including a polyolefin porous film;
    a porous layer containing a polyvinylidene fluoride-based resin;
    a positive electrode plate of which a value represented by Formula (1) below falls within a range of not less than 0.00 and not more than 0.50; and
    a negative electrode plate of which a value represented by Formula (1) below falls within a range of not less than 0.00 and not more than 0.50, $$|1-T/M| \tag{1}$$

where T represents a critical load distance in a TD in a scratch test under a constant load of 0.1 N, and M represents a critical load distance in an MD in a scratch test under a constant load of 0.1 N, the polyolefin porous film having a temperature rise ending period of 2.9 seconds·m²/g to 5.7 seconds·m²/g with respect to an amount of resin per unit area in a case where the polyolefin porous film has been impregnated with N-methylpyrrolidone containing 3% by weight of water and has then been irradiated with a microwave having a frequency of 2455 MHz and an output of 1800 W, the porous layer being provided between the nonaqueous electrolyte secondary battery separator and at least one of the positive electrode plate and the negative electrode plate, the polyvinylidene fluoride-based resin contained in the porous layer containing an α-form polyvinylidene fluoride-based resin in an amount of not less than 35.0 mol % with respect to 100 mol % of a combined amount of the α-form polyvinylidene fluoride-based resin and a β-form polyvinylidene fluoride-based resin contained in the polyvinylidene fluoride-based resin, a content of the α-form polyvinylidene fluoride-based resin being calculated by (i) waveform separation of (α/2) observed at around −78 ppm in a $^{19}$F-NMR spectrum obtained from the porous layer and (ii) waveform separation of {(α/2)+β} observed at around −95 ppm in the $^{19}$F-NMR spectrum obtained from the porous layer.

2. The nonaqueous electrolyte secondary battery as set forth in claim 1, wherein the positive electrode plate contains a transition metal oxide.

3. The nonaqueous electrolyte secondary battery as set forth in claim 1, wherein the negative electrode plate contains graphite.

4. The nonaqueous electrolyte secondary battery as set forth in claim 1, further comprising:

another porous layer which is provided between (i) the nonaqueous electrolyte secondary battery separator and (ii) at least one of the positive electrode plate and the negative electrode plate.

5. The nonaqueous electrolyte secondary battery as set forth in claim 4, wherein the another porous layer contains at least one resin selected from the group consisting of a polyolefin, a (meth)acrylate-based resin, a fluorine-containing resin (excluding a polyvinylidene fluoride-based resin), a polyamide-based resin, a polyester-based resin and a water-soluble polymer.

6. The nonaqueous electrolyte secondary battery as set forth in claim 5, wherein the polyamide-based resin is an aramid resin.

* * * * *